(12) United States Patent
Salaun et al.

(10) Patent No.: US 11,582,703 B2
(45) Date of Patent: Feb. 14, 2023

(54) METHOD AND APPARATUS FOR MAXIMIZING WEIGHTED SUM RATE

(71) Applicant: Nokia Technologies Oy, Espoo (FI)

(72) Inventors: Lou Salaun, Saint Jean de Reauregare (FR); Chung Shue Chen, Massy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/292,858

(22) PCT Filed: Nov. 19, 2018

(86) PCT No.: PCT/EP2018/081779
§ 371 (c)(1),
(2) Date: May 11, 2021

(87) PCT Pub. No.: WO2020/104008
PCT Pub. Date: May 28, 2020

(65) Prior Publication Data
US 2021/0410082 A1 Dec. 30, 2021

(51) Int. Cl.
*H04W 52/34* (2009.01)
*H04W 52/36* (2009.01)
*H04W 52/24* (2009.01)

(52) U.S. Cl.
CPC ....... *H04W 52/346* (2013.01); *H04W 52/243* (2013.01); *H04W 52/367* (2013.01)

(58) Field of Classification Search
CPC ............. H04W 52/346; H04W 52/243; H04W 52/367; H04W 52/267; H04L 5/0073; H04L 5/04; H04L 5/0037
See application file for complete search history.

(56) References Cited

U.S. PATENT DOCUMENTS

| | | | |
|---|---|---|---|
| 2009/0232074 A1* | 9/2009 | Yang | H04W 72/1257 455/450 |
| 2019/0044591 A1* | 2/2019 | Sano | H04B 7/0456 |
| 2020/0396760 A1* | 12/2020 | Yi | H04L 1/1864 |

OTHER PUBLICATIONS

Zhang, Jingru, et al., "Joint Subcarrier assignment and Downlink-Uplink Time-Power Allocation for Wireless Powered OFDM-NOMA Systems", Oct. 10, 2018, IEEE, abstract only, 2 pgs.

(Continued)

*Primary Examiner* — John J Lee
(74) *Attorney, Agent, or Firm* — Joseph C. Drish; Harrington & Smith

(57) ABSTRACT

An apparatus for use by a communication network control element or function configured to conduct a radio resource management, the apparatus being configured to cause the apparatus at least: to acquire input parameters; to process the input parameters by using a first-stage procedure for maximizing a weighted sum-rate for a fixed subcarrier allocation for all subcarriers, and a second-stage procedure for determining a power allocation for a single subcarrier under consideration of specified multiplexing and interference cancellation constraints wherein a processing result output from the first-stage procedure is input into the second-stage procedure, and a processing result output from the second-stage procedure is returned to the first-stage procedure; and to output, on the basis of results of the processing in the first-stage procedure and the second-stage procedure, a power setting for at least one subcarrier.

13 Claims, 10 Drawing Sheets

(56) References Cited

OTHER PUBLICATIONS

Guo, Shaozhen, et al., "Distributed optimization for downlink broadband small cell networks", Jun. 8, 2015, IEEE, abstract only, 2 pgs.
Salaun, Lou, et al., "Optimal Joint Subcarrier and Power Allocation in NOMA is Strongly NP-Hard", May 20, 2018, IEEE, 7 pgs.

* cited by examiner

UL uplink
UMTS universal mobile telecommunication system
WSR weighted sum-rate

METHOD AND APPARATUS FOR MAXIMIZING WEIGHTED SUM RATE

CROSS REFERENCE TO RELATED APPLICATION

This patent application is a U.S. National Stage application of International Patent Application Number PCT/EP2018/081779 filed Nov. 19, 2018, which is hereby incorporated by reference in its entirety.

BACKGROUND

Field

Examples of embodiments relate to apparatuses, methods, systems, computer programs, computer program products and (non-transitory) computer-readable media usable for conducting radio resource management in a communication network using non-orthogonal multiple access (NOMA), and in particular to apparatuses, methods, systems, computer programs, computer program products and (non-transitory) computer-readable media usable for maximizing a weighted sum rate in a multi-carrier NOMA with cellular power constraints.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partnership Project
4G fourth generation
5G fifth generation
BS base station
CN core network
CPU central processing unit
DL downlink
eNB evolved node B
ETSI European Telecommunications Standards Institute
FTPC fractional transmit power control
gNB next generation node B
JSPA joint subcarrier and power allocation
LDDP Lagrangian duality and dynamic programming
LTE Long Term Evolution
LTE-A LTE Advanced
MC-NOMA multi carrier NOMA
MCPC multi carrier power control
NOMA non-orthogonal multiple access
NG new generation
NP non-deterministic polynomial acceptable problems
NR new radio
OFDMA orthogonal frequency-division multiple access
OMA orthogonal multiple access
QoS quality of service
RRM radio resource management
SCUS single carrier user selection
SIC successive interference cancellation
UE user equipment

SUMMARY

According to an example of an embodiment, there is provided, for example, an apparatus for use by a communication network control element or function configured to conduct a radio resource management control for a communication to at least one communication element or function in a communication network by using a plurality of subcarriers, the apparatus comprising at least one processing circuitry, and at least one memory for storing instructions to be executed by the processing circuitry, wherein the at least one memory and the instructions are configured to, with the at least one processing circuitry, cause the apparatus at least: to acquire input parameters; to process the input parameters by using a first-stage procedure for maximizing a weighted sum-rate for a fixed subcarrier allocation for all subcarriers, and a second-stage procedure for determining a power allocation for a single subcarrier under consideration of specified multiplexing and interference cancellation constraints, wherein a processing result output from the first-stage procedure is input into the second-stage procedure, and a processing result output from the second-stage procedure is returned to the first-stage procedure; and to output, on the basis of results of the processing in the first-stage procedure and the second-stage procedure, a power setting for at least one subcarrier.

Furthermore, according to an example of an embodiment, there is provided, for example, a method for use in a communication network control element or function configured to conduct a radio resource management control for a communication to at least one communication element or function in a communication network by using a plurality of subcarriers, the method comprising acquiring input parameters; processing the input parameters by using a first-stage procedure for maximizing a weighted sum-rate for a fixed subcarrier allocation for all subcarriers, and a second-stage procedure for determining a power allocation for a single subcarrier under consideration of specified multiplexing and interference cancellation constraints, wherein a processing result output from the first-stage procedure is input into the second-stage procedure, and a processing result output from the second-stage procedure is returned to the first-stage procedure; and outputting, on the basis of results of the processing in the first-stage procedure and the second-stage procedure, a power setting for at least one subcarrier.

According to further refinements, these examples may include one or more of the following features:
  as the input parameters, a maximum total power budget, a maximum power budget for each subcarrier, and at least one of a maximum number of multiplexed users per subcarrier and a number of allocated users per subcarrier may be acquired;
  in the first-stage procedure, as the input parameters, the maximum total power budget, the maximum power budget for each subcarrier, and the maximum number of multiplexed users per subcarrier may be processed, by using a projected gradient descent on each power budget for each subcarrier to maximize the weighted sum-rate; from the first-stage procedure to the second stage procedure, an indication of the subcarrier to be considered, the maximum number of multiplexed users per subcarrier and the power budget for the indicated subcarrier may be output; in the second-stage procedure, the indication of the subcarrier to be considered, the maximum number of multiplexed users per subcarrier and the power budget for the indicated subcarrier may be processed for computing an optimal single-carrier power allocation under the power budget for the indicated subcarrier and by considering a constraint indicating that the number of allocated users is equal to or less than the maximum number of multiplexed users per subcarrier; from the second-stage procedure to the first-stage procedure, an indication of the subcarrier to be considered, a parameter for determining the weighted sum-rate and the computed optimal single-carrier power allocation may be output; process, in the first-stage procedure, the parameter for determining the weighted sum-rate and the computed optimal single-carrier power allocation may be processed;

in the processing in the first-stage procedure of the parameter for determining the weighted sum-rate and the computed optimal single-carrier power allocation, at least one of outputting the computed optimal single-carrier power allocation, and using the parameter for determining the weighted sum-rate and the computed optimal single-carrier power allocation in a next iteration for providing an input into the second-stage procedure by updating parameters used in the processing of the first-stage procedure may be conducted;

the processing in the first-stage procedure and the second stage procedure may be based on $$\text{maximize}_{p} \sum_{k \in \mathcal{K}} w_k \sum_{n \in \mathcal{N}} R_k^n(p^n), \quad (P)$$

$$\text{subject to } C1: \sum_{k \in \mathcal{K}} \sum_{n \in \mathcal{N}} p_k^n \leq P_{max},$$

$$C2: \sum_{k \in \mathcal{K}} p_k^n \leq P_{max}^n, n \in \mathcal{N},$$

$$C3: p_k^n \geq 0, k \in \mathcal{K}, n \in \mathcal{N},$$

$$C4: |\mathcal{U}_n| \leq M, n \in \mathcal{N}.$$

wherein $w_K$ is a sequence of K positive weights, $R_k^n(p^n)$ is a maximum achievable data rage of user k on a subcarrier n, P represents a joint subcarrier and power allocation optimization problem P, C1 represents a cellular power constraint in form of the total power budget, C2 sets a power limit for each subcarrier n, C3 defines that the allocated powers remain non-negative, and C4 restricts the maximum number of multiplexed users per subcarrier to M;

the communication network control element or function may be configured to use at least one of non-orthogonal multiple access and orthogonal multiple access for communicating with the at least one communication element or function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
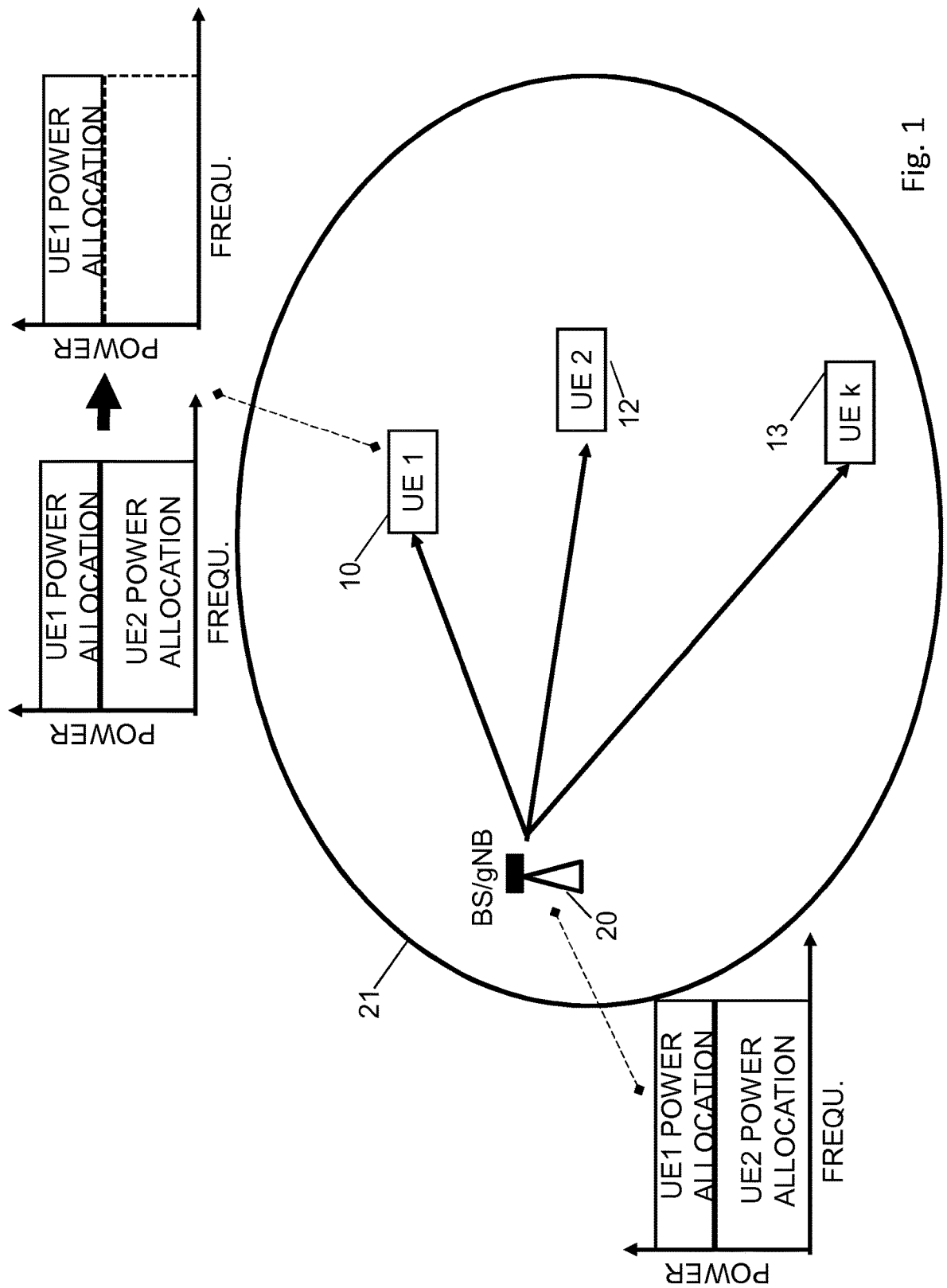
FIG. 1 shows a diagram illustrating an example of a communication network using MC-NOMA in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular 3$^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular 2$^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3$^{rd}$ Generation Partnership Project (3GPP), Telecoms & Internet converged Services & Protocols for Advanced Networks (TISPAN), the International Telecommunication Union (ITU), 3$^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

In legacy communication networks, such as third generation (3G) cellular networks, frequency division multiple access (FDMA), time division multiple access and code division multiple access were introduced, respectively. In 4G networks like LTE and LTE-A, techniques like orthogonal frequency division multiple access (OFDMA) are adopted as an OMA approach, allowing to avoid mutual interference among users and providing therefore good system-level performance even with simplified receivers.

However, future radio access systems, such as 5G systems, have increased demands, for example due to an increasing demand of mobile Internet and the Internet of Things which poses challenging requirements for 5G wireless communications, such as high spectral efficiency and massive connectivity.

As a possible technology allowing to meet these demands, non-orthogonal multiple access (NOMA) is introduced. NOMA represents a multiple access technique allowing to significantly improve the spectral efficiency of mobile communication networks, and it outperforms orthogonal schemes, such as OFDMA, in terms of spectral efficiency and massive connectivity.

Basically, NOMA is based on the usage of signals that possess significant differences e.g. in power levels. It is then possible to totally isolate the one signal (e.g. the high level signal) at the receiver and then cancel it out to leave only the other signal (e.g. the low level signal). In this way, NOMA exploits the path loss differences amongst users, although it does need additional processing power in the receiver.

NOMA schemes can be classified into two types: power-domain multiplexing and code-domain multiplexing. In the following, principles for power-domain multiplexing are described. Here, different users are allocated different power coefficients according to their channel conditions in order to achieve a high system performance. In particular, multiple users' information signals are superimposed at the transmitter side. At the receiver side successive interference cancellation (SIC) is applied for decoding the signals one by one until the desired user's signal is obtained, providing a good trade-off between the throughput of the system and the user fairness. Power-domain multiplexing is easy to implement as considerable changes are not required on the existing networks. Also, it does not require additional bandwidth in order to improve spectral efficiency.

FIG. 1 shows a diagram illustrating an example of a communication network using MC-NOMA in which examples of embodiments are implementable. Specifically, in FIG. 1, a communication network control element or function 20, such as a BS or a gNB, controls communication in a network portion (such as a cell) 21. Reference signs 10, 12 and 13 denote communication elements or functions (UE 1, UE 2, . . . UE k), respectively, which can communicate with the communication network vie the communication network control element or function 20.

In downlink NOMA, the transmit signal from the BS 20 and the received signal at the UEs (in the following, UE 1 10 and UE 2 20 are considered, but the principles described below are also application in case of more than two UEs) is composed of a superposition of transmit signals of both UEs. This is indicated in the additional diagrams illustrated in FIG. 1, especially the diagram linked to the BS 10, where a transmit signal composed of a part representing a small power allocation for UE 1 10 and part representing a large power allocation for UE 2 12 are indicated in frequency-power diagram).

Multi-user signal separation is implemented at the UE side so that each UE is able to retrieve the signal dedicated to the corresponding UE so as to decode its own data. For example, non-linear receivers such as maximum likelihood detection or SIC (Successive Interference Cancellation) is used. In case of SIC, the optimal order for decoding is in the order of the decreasing channel gain normalized by noise and inter-carrier interference power. Based on this order, it is possible that any user can correctly decode the signals of other users whose decoding order comes before the corresponding user.

Considering the case shown in FIG. 1, when two UEs (i.e. UE 1 10 and US 2 12) are involved, UE 2 12 does not perform interference cancellation since it comes first in the decoding order. UE 1 10 first decodes the UE 2 signal, and subtracts its component from total received signal. Thus, it obtains its own signal component and decodes it, without interference from UE 2 signal. This is illustrated in the additional diagrams linked to the UE 1 10 in FIG. 1.

As described above, the principle of MC-NOMA is to multiplex several users on the same subcarrier by performing signals superposition at the transmitter side. Successive interference cancellation (SIC) is applied at the receiver side to mitigate interference between superposed signals. MC-NOMA achieves a better spectral efficiency and higher data rates than OMA schemes.

Careful optimization of the transmit powers is required to control the intra-carrier interference of superposed signals and maximize the achievable data rates. Besides, due to error propagation and decoding complexity concerns in practice, subcarrier allocation for each transmission also needs to be optimized. As a consequence, joint subcarrier and power allocation problems in NOMA have received much attention.

The joint subcarrier and power allocation problem in NOMA is NP-hard to solve in general, due to complex impacts of signal superposition on each user's achievable data rates, as well as combinatorial constraints on the number of multiplexed users per sub-carrier to mitigate error propagation. In this class of problems, weighted sum-rate (WSR) maximization is especially important as it can achieve different tradeoffs between sum-rate performance and user fairness. One may also consider to use the weights to perform fair resource allocation in a stable scheduling.

Conventionally, two types of power constraints are considered. On the one hand, cellular power constraint is mostly used in downlink transmissions to represent the total transmit power budget available at the BS. On the other hand, individual power constraint sets a power limit independently for each user. The latter is more appropriate for uplink scenarios, nevertheless it can also be applied to the downlink.

It is known that WSR maximization in OFDMA systems is polynomial time solvable if cellular power constraint is considered but strongly NP-hard with individual power constraints. It is also known that MC-NOMA with individual power constraints is strongly NP-hard. Several algorithms are developed to perform subcarrier and/or power allocation in this setting. For example, fractional transmit power control (FTPC) is a simple heuristic that allocates a fraction of the total power budget to each user based on their channel condition. Also approaches where heuristic user pairing strategies and iterative resource allocation algorithms are studied for uplink transmissions are known. A time efficient iterative waterfilling heuristic can be used to solve the problem with equal weights. A nearly optimal WSR is achieved by a scheme using dynamic programming and Lagrangian duality techniques (also referred to as LDDP). This scheme has a high computational complexity, which is critical for systems with low latency requirements.

It is not known if MC-NOMA with cellular power constraint is polynomial time solvable or NP-hard. Known optimization schemes for this problem are either heuristics with no theoretical performance guarantee or algorithms with impractical computational complexity. For example, a greedy user selection and heuristic power allocation scheme based on difference-of-convex programming is proposed wherein a monotonic optimization is employed to develop an optimal resource allocation policy, which serves as benchmark due to its exponential complexity. LDDP can also be applied to cellular power constraint scenarios, but it has very high complexity as well.

In view of the above, improvements in radio resource management (RRM) in a non-orthogonal multiple access (NOMA) system, which is considered e.g. in connection with 5G new radio (NR), are possible. Specifically, improvements can be made with regard to the WSR maximization problem in a downlink MC NOMA system with cellular power constraint, in order to avoid problems in large systems due to high computational complexity of existing solutions.

In the following, different exemplifying embodiments will be described using, as an example of a communication network to which examples of embodiments may be applied, a communication network architecture based on 3GPP standards for a communication network, such as a 5G, using NOMA, without restricting the embodiments to such an architecture, however. It is obvious for a person skilled in the art that the embodiments may also be applied to other kinds of communication networks having suitable means by adjusting parameters and procedures appropriately, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to embodiments of the invention, a new RRM control scheme is proposed in which the problem to maximize the system's WSR in a DL MC NOMA system is solved by using two tasks, i.e. a single-carrier user selection (SCUS) procedure, which solves the user selection combinatorial problem, and a multi-carrier power control (MCPC) procedure to solve the multi-carrier power control problem. Specifically, in SCUS, the optimization search space is restricted to a single subcarrier and the problem to be solved is to find a power allocation on the subcarrier satisfying certain multiplexing and successive interference cancellation (SIC) constraints. On the other hand, MCPC aims to maximize the WSR for fixed subcarrier allocation for all subcarriers.

Both procedures SCUS and MCPS are combinable into a joint subcarrier and power allocation (JSPA) procedure representing a two-stage optimization procedure. By means of this, the system's WSR can be maximized, i.e. a near-optimal sum-rate and user fairness can be achieved with an decreased computational effort.

That is, according to examples of embodiments, two polynomial time solvable sub-problems are processed. The MCPC (given a fixed subcarrier allocation) sub-problem is non-convex. By taking advantage of its separability property, according to examples of embodiments, an optimal and low complexity algorithm (MCPC) based on projected gradient descent is provided, as described below. Furthermore, the SCUS sub-problem is a non-convex mixed-integer problem that is solved, according to examples of embodiments, by using dynamic programming (SCUS).

Furthermore, according to example of embodiments, a procedure is provided regarding how each sub-problem's particular structure can facilitate the algorithm design. In that respect, the above MCPC and SCUS represent examples of basic building blocks that can be applied in a wide range of resource allocation problems. That is, mathematical tools are provided based on the analysis of the separability property in MCPC and the combinatorial constraints in SCUS which are usable for other similar resource allocation optimization problems.

It is to be noted that examples of embodiments are applicable to a variable number of users. While conventional approaches restrict the number of multiplexed users per subcarrier, denoted by M, to be equal to 2, examples of embodiments of the invention can be applied for an arbitrary number of superposed signals on each subcarrier, i.e., $M \geq 1$. The value of M can be set depending on error propagation and decoding complexity concerns in practice, for example.

In order to solve the general WSR maximization problem, an efficient heuristic is proposed by combining MCPC and SCUS into the JSPA procedure. Thus, a near-optimal sum-rate and user fairness can be achieved, wherein a significant improvement in performance over OMA is still provided.

In the following, examples of embodiments are described in further detail by referring to a system model and notations being used, a formulation of the underlying WSR problem, a description of the used algorithms and an analysis of their optimality and complexity, which is exemplified by illustrating corresponding numerical results in comparison to existing approaches like LDDP and FTPC in order to highlight sum-rate and fairness performance, as well as the computational complexity of the respective approaches.

With regard to the system model and notations, a general example for a NOMA system as shown in FIG. 1 is used as a basis. That is, in the following, a downlink multi-carrier NOMA system is considered composed of one base station (BS 20) serving K users (i.e. UEs 10, 12 and 13, in FIG. 1, for example).

The index set of users is denoted by $\mathcal{K} \triangleq \{1, \ldots, K\}$, and the set of subcarriers is denoted by $\mathcal{N} \triangleq \{1, \ldots, N\}$. The total system bandwidth W is divided into N subcarriers of bandwidth $W_n = W/N$, for each n∈531 $\mathcal{N}$. Orthogonal frequency division is assumed, so that adjacent subcarriers do not interfere each other. Moreover, each subcarrier n∈ $\mathcal{N}$ experiences frequency-flat block fading on its bandwidth $W_n$.

Let $p_k^n$ denotes the transmit power from the BS to user $k \in \mathcal{K}$ on subcarrier $n \in \mathcal{N}$. User k is said to be active on subcarrier n if $p_k^n > 0$, and inactive otherwise. In addition, let $g_k^n$ be the channel gain between the BS and user k on subcarrier n, and $\eta_k^n$ be the received noise power. For simplicity of notations, the normalized noise power is defined as $\tilde{\eta}_k^n \triangleq \eta_k^n / g_k^n$. By $p \triangleq (p_k^n)_{k \in \mathcal{K}, n \in \mathcal{N}}$ the vector of all transmit powers is denoted, and by $p^n \triangleq (p_k^n)_{k \in \mathcal{K}}$ the vector of transmit powers on subcarrier n is denoted.

In power domain NOMA, several users (UEs) are multiplexed on the same subcarrier using superposition coding, as described above. A common approach is, for example, to limit the number of superposed signals on each subcarrier to be no more than M. The value of M is meant to characterize practical limitations of SIC due to decoding complexity and error propagation. The set of active users on subcarrier n is represented by $\mathcal{U}_n \triangleq \{k \in \mathcal{K} : p_k^n > 0\}$. The aforementioned constraint can then be formulated as $\forall n \in \mathcal{N}$, $|\mathcal{U}_n| \leq M$, where |·| denotes the cardinality of a finite set. Each subcarrier is modeled, for example, as a multi-user Gaussian broadcast channel and SIC is applied at the receiver side to mitigate intra-band interference.

The SIC decoding order on subcarrier n is usually defined as a permutation over the active users on n, i.e., $\pi_n$: $\{1, \ldots, |\mathcal{U}_n|\} \to \mathcal{U}_n$. However, for ease of reading, this is represented by a permutation function over all users $\mathcal{K}$, i.e., $\pi_n: \{1, \ldots, K\} \to \mathcal{K}$. These two definitions are equivalent in the presented model since the Shannon capacity (2) does not depend on the inactive users $k \in \in \mathcal{K} \setminus \mathcal{U}_n$, for which $p_k^n = 0$. For $i \in \in \{1, \ldots, K\}$, $\pi_n(i)$ returns the i-th decoded user's index. Conversely, user k's decoding order is given by $\pi_n^{-1}(k)$.

According to examples of embodiments, a decoding order is considered comprising decoding users' signals from the highest to the lowest normalized noise power:

$$\tilde{\eta}_{\pi_n(1)}^n \geq \tilde{\eta}_{\pi_n(2)}^n \geq \ldots \geq \tilde{\eta}_{\pi_n(K)}^n \quad (1)$$

User $\pi_n(i)$ first decodes the signals of users $\pi_n(1)$ to $\pi_n(i-1)$ and subtracts them from the superposed signal before decoding its own signal. Interference from users $\pi_n(j)$ for $j>i$ is treated as noise. The maximum achievable data rate of user k on subcarrier n is given by Shannon capacity:

$$R_k^n(p^n) \triangleq W_n \log_2\left(1 + \frac{g_k^n p_k^n}{\sum_{j=\pi_n^{-1}(k)+1}^{K} g_k^n p_{\pi_n(j)}^n + \eta_k^n}\right)$$

$$\stackrel{(a)}{=} W_n \log_2\left(1 + \frac{p_k^n}{\sum_{j=\pi_n^{-1}(k)+1}^{K} p_{\pi_n(j)}^n + \tilde{\eta}_k^n}\right), \quad (2)$$

where equality (a) is obtained after normalizing by $g_k^n$. Assuming perfect SIC, interference from users $\pi_n(j)$ for $j < \pi_n^{-1}(k)$ is completely removed in (2).

Next, the problem to be solved in the procedure according to examples of embodiments is formulated.

Let $w = \{w_1, \ldots, w_K\}$ be a sequence of K positive weights. The main focus is to solve the following joint subcarrier and power allocation optimization problem P:

$$\underset{p}{\text{maximize}} \sum_{k \in \mathcal{K}} w_k \sum_{n \in \mathcal{N}} R_k^n(p^n), \quad (P)$$

subject to $C1: \sum_{k \in \mathcal{K}} \sum_{n \in \mathcal{N}} p_k^n \leq P_{max}$, $C2: \sum_{k \in \mathcal{K}} p_k^n \leq P_{max}^n, n \in \mathcal{N}$, $C3: p_k^n \geq 0, k \in \mathcal{K}, n \in \mathcal{N}$, $C4: |\mathcal{U}_n| \leq M, n \in \mathcal{N}$.

The objective of P is to maximize the system's WSR. As discussed above, this objective function has received much attention since its weights w can be chosen to achieve different tradeoffs between sum-rate performance and fairness. The weights can also be tuned to perform fair resource allocation in a stable scheduling. Note that constraint C1 represents the cellular power constraint, i.e., a total power budget $P_{max}$ at the BS 20. In constraint C2, a power limit of $P_{max}^n$ for each subcarrier n is set. This is a common assumption in multi-carrier systems. Constraint C3 ensures that the allocated powers remain non-negative. Due to decoding complexity and error propagation in SIC, the maximum number of multiplexed users per subcarrier is restricted to M in constraint C4.

For a further detailed explanation, the following change of variables is considered:

$$\forall n \in \mathcal{N}, x_i^n \triangleq \begin{cases} \sum_{j=i}^{K} p_{\pi_n(j)}^n, & \text{if } i \in \{1, \ldots, K\}, \\ 0, & \text{if } i = K+1. \end{cases} \quad (3)$$

It is defined that $x \triangleq (x_i^n)_{i \in \{1, \ldots, K\}, n \in \mathcal{N}}$ and $x^n \triangleq (x_i^n)_{i \in \in \{1, \ldots, K\}}$.

A problem equivalent to the above defined problem P is considered in the following helping theorem (referred to as Lemma) Lemma 1 as equivalent problem P'. That is problem P is equivalent to problem P' formulated below:

$$\underset{x}{\text{maximize}} \ f(x) \sum_{n \in \mathcal{N}} \sum_{i=1}^{K} f_i^n(x_i^n), \quad (P')$$

subject to $C1': \sum_{n \in \mathcal{N}} x_1^n \leq P_{max}$, $C2': x_1^n \leq P_{max}^n, n \in \mathcal{N}$, $C3': x_i^n \geq x_{i+1}^n, i \in \{1, \ldots, K\}, n \in \mathcal{N}$, $C3'': x_{K+1}^n = 0, n \in \mathcal{N}$, $C4': |\mathcal{U}_n'| \leq M, n \in \mathcal{N}$, where for any $i \in \in \{1, \ldots, K\}$ and $n \in \in \mathcal{N}$:

$$f_i^n(x_i^n) \triangleq \begin{cases} W_n \log_2\left((x_1^n + \tilde{\eta}_{\pi_n(1)}^n)^{w_{\pi_n(1)}}\right), & \text{if } i = 1, \\ W_n \log_2\left(\frac{(x_i^n + \tilde{\eta}_{\pi_n(i)}^n)^{w_{\pi_n(i)}}}{(x_i^n + \tilde{\eta}_{\pi_n(i-1)}^n)^{w_{\pi_n(i-1)}}}\right), & \text{if } i > 1, \end{cases}$$

and where $\mathcal{U}'_n \triangleq \{i \in \in \{1, \ldots, K\}: x_i^n > x_{i+1}^n\}$.

This is proved as follows.

The objective of P can be written as:

$$\sum_{k \in \mathcal{K}} w_k \sum_{n \in \mathcal{N}} R_k^n(p^n) = \sum_{n \in \mathcal{N}} \sum_{k \in \mathcal{K}} w_k R_k^n(p^n)$$

$$\stackrel{(b)}{=} \sum_{n \in \mathcal{N}} W_n \sum_{i=1}^{K} w_{\pi_n(i)} \log_2\left(\frac{\sum_{j=i}^{K} p_{\pi_n(j)}^n + \tilde{\eta}_{\pi_n(i)}^n}{\sum_{j=i+1}^{K} p_{\pi_n(j)}^n + \tilde{\eta}_{\pi_n(i)}^n}\right)$$

$$\stackrel{(c)}{=} \sum_{n \in \mathcal{N}} W_n \sum_{i=1}^{K} \log_2\left(\frac{\left(\sum_{j=i}^{K} p_{\pi_n(j)}^n + \tilde{\eta}_{\pi_n(i)}^n\right)^{w_{\pi_n(i)}}}{\left(\sum_{k=i+1}^{K} p_{\pi_n(j)}^n + \tilde{\eta}_{\pi_n(i)}^n\right)^{w_{\pi_n(i)}}}\right)$$

$$\stackrel{(d)}{=} \sum_{n \in \mathcal{N}} W_n \left[w_{\pi_n(1)} \log_2\left(\sum_{j=1}^{K} p_{\pi_n(j)}^n + \tilde{\eta}_{\pi_n(1)}^n\right) + \right.$$

-continued $$\sum_{i=2}^{K} \log_2\left(\frac{\left(\sum_{j=i}^{K} p_{\pi_n(j)}^n + \tilde{\eta}_{\pi_n(i)}^n\right)^{w_{\pi_n(i)}}}{\left(\sum_{j=i}^{K} p_{\pi_n(j)}^n + \tilde{\eta}_{\pi_n(i-1)}^n\right)^{w_{\pi_n(i-1)}}}\right) +$$

$$w_{\pi_n(K)} \log_2\left(\frac{1}{\tilde{\eta}_{\pi_n(k)}^n}\right)\Bigg].$$

Equality (b) comes from the definition (2). At (c), the weights $w_{\pi_n(i)}$ are put inside the logarithm. Finally, (d) is obtained by combining the numerator of the i-th term with the denominator of the (i−1)-th term, for $i \in \{2, \ldots, K\}$.

The constant term $w_{\pi_n(K)} \log_2(1/\tilde{\eta}_{\pi_n(K)}^n)$ can be removed from the objective function, without loss of generality. By applying the change of variables (3), the equivalent problem P' is derived. Constraints C1' and C2' are respectively equivalent to C1 and C2 since $x_1^n = \sum_{j=1}^{K} p_{\pi_n(j)}^n = \sum_{k \in \mathcal{K}} p_k^n$, for $n \in \mathcal{N}$. Constraints C3' and C3" come from C3 and the fact that $x_i^n - x_{i+1}^n = p_{\pi_n(i)}^n$, for any $i \in \{1, \ldots, K\}$ and $n \in \mathcal{N}$. In the same way, the active users set in C4' is defined as $\mathcal{U}'_n \triangleq \{i \in \{1, \ldots, K\}: x_i^n > x_{i+1}^n\}$.

The advantage of this formulation P' is that it exhibits a separable objective function in both dimensions $i \in \{1, \ldots, K\}$ and $n \in \mathcal{N}$. In other words, it can be written as a sum of functions $f_i^n$, each only depending on one variable $x_i^n$. In the following section, this separability property is used to design an efficient algorithms to solve P'. The solution of P can then be obtained by solving P'.

In the following, the algorithm design is described.

Decomposing the joint subcarrier and power allocation problem P' into smaller sub-problems allows to develop efficient algorithms by taking advantage of each sub-problem's particular structure. The technical details are given below.

Regarding the SCUS, the optimization search space is restricted to a single subcarrier. Given $n \in \mathcal{N}$ and a power budget $\overline{P}^n$, the single-carrier user selection sub-problem P'$_{SCUS}$(n) consists in finding a power allocation on n satisfying the multiplexing and SIC constraint C4'.

$$\underset{x^n}{\text{maximize}} \sum_{i=1}^{K} f_i^n(x_i^n), \quad (\text{P}'_{SCUS}(n))$$

subject to $C2', C3', C3'', C4'$.

In the following, auxiliary functions are introduced helping for the algorithm design. For $n \in \mathcal{N}$, $i \in \{1, \ldots, K\}$ and $j \leq i$, assume that the consecutive variables $x_j^n, \ldots, x_i^n$ are all equal to a certain value $x \in [0, \overline{P}^n]$. $f_{j,i}^n$ is defined as:

$$f_{j,i}^n(x) \triangleq \sum_{l=j}^{i} f_l^n(x)$$

$$= \begin{cases} W_n \log_2\left((x + \tilde{\eta}_{\pi_n(i)}^n)^{w_{\pi_n(i)}}\right), & \text{if } j = 1, \\ W_n \log_2\left(\frac{(x + \tilde{\eta}_{\pi_n(i)}^n)^{w_{\pi_n(i)}}}{(x + \tilde{\eta}_{\pi_n(j-1)}^n)^{w_{\pi_n(j-1)}}}\right), & \text{if } j > 1. \end{cases}$$

This simplification of notation is relevant for the analysis of SCUS (see Algorithm 2 described below) and also the coming MCPC (see Algorithm 4 described below). Indeed, if users $j, \ldots, i-1$ are not active (i.e., $j, \ldots, i-1 \notin \mathcal{U}'_n$), then $x_j^n = \ldots = x_i^n$, therefore $\sum_{l=j}^{i} f_l^n$ can be replaced by $f_{j,i}^n$ and $x_{j+1}^n, \ldots, x_i^n$ are redundant with $x_j^n$. If constraint C4' is satisfied, up to M users are active on each subcarrier. Thus, evaluating and optimizing the objective function of P only requires O(M) operations.

Figure 10:
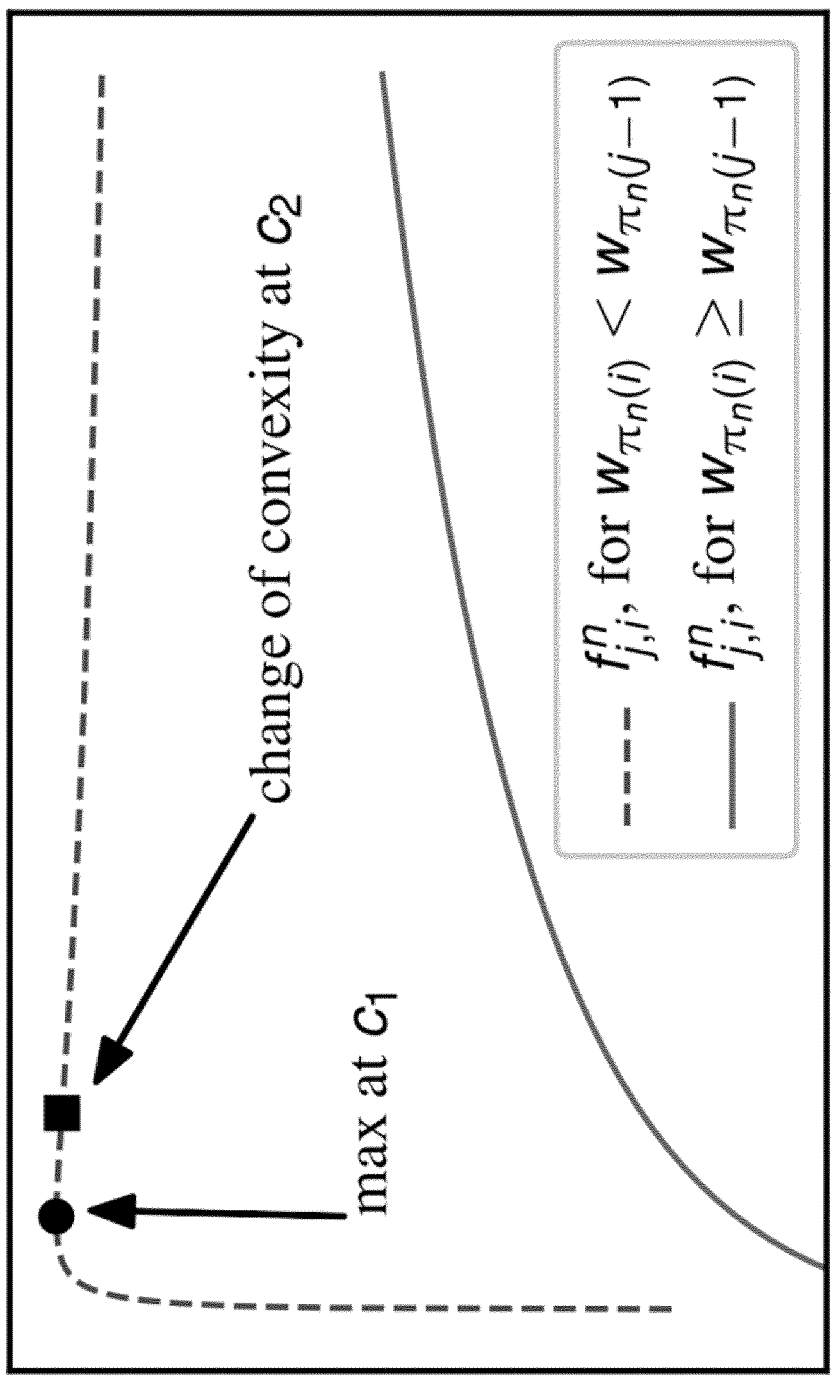
FIG. 10 shows a diagram illustrating a function used for algorithm design.

The properties of $f_{j,i}^n$ are discussed in the following Lemma 2. Note that $f_i^n = f_{i,i}^n$, therefore Lemma 2 also holds for functions $f_i^n$. FIG. 10 illustrates an example of $f_{j,i}^n$ which shows two general forms of function $f_{j,i}^n$.

Let $n \in \mathcal{N}$, $i \in \{1, \ldots, K\}$, and $j \leq i$, then:

If $j = 1$ or $w_{\pi_n(i)} \geq w_{\pi_n(j-1)}$, then $f_{j,i}^n$ is strictly increasing and concave on $[0, \infty)$.

otherwise when $j > 1$ and $w_{\pi_n(i)} < w_{\pi_n(j-1)}$, $f_{j,i}^n$ is strongly unimodal. It increases on $(-\tilde{\eta}_{\pi_n(j-1)}, c_1]$ and decreases on $[c_1, \infty)$, where $$c_1 = \frac{w_{\pi_n(j-1)} \tilde{\eta}_{\pi_n(i)} - w_{\pi_n(i)} \tilde{\eta}_{\pi_n(j-1)}}{w_{\pi_n(i)} - w_{\pi_n(j-1)}}.$$

Besides, $f_{j,i}^n$ is concave on $(-\tilde{\eta}_{\pi_n(j-1)}, c_2]$ and convex on $[c_2, \infty)$, where $$c_2 = \frac{\sqrt{w_{\pi_n(j-1)}} \tilde{\eta}_{\pi_n(i)} - \sqrt{w_{\pi_n(i)}} \tilde{\eta}_{\pi_n(j-1)}}{\sqrt{w_{\pi_n(i)}} - \sqrt{w_{\pi_n(j-1)}}} \geq c_1.$$

As a first algorithm 1, a pseudocode MaxF is presented which is used to compute the maximum of $f_{j,i}^n$ on $[0, \overline{P}^n]$ following the result of Lemma 2. MaxF only requires a constant number of basic operations, therefore its complexity is O(1). For ease of reading, some system parameters of a given instance of P, for all $n \in \mathcal{N}$, are summarized as follows:

$$\mathcal{J}^n = (w, \mathcal{K}, W_n, (g_k^n)_{k \in \mathcal{K}}, (\eta_k^n)_{k \in \mathcal{K}}).$$

---

Algorithm 1: Compute maximum of $f_{j,i}^n$ on $[0, \overline{P}^n]$
function MaxF(j, i, $\mathcal{J}^n$, $\overline{P}^n$)

1: $\alpha \leftarrow \pi_n(i)$
2: $b \leftarrow \pi_n(j - 1)$
3: if $j = 1$ or $w_\alpha \geq w_b$ then
4:    return $\overline{P}^n$
5: else
6:    return $\max\left\{0, \min\left(\frac{w_b \tilde{\eta}_a - w_a \tilde{\eta}_b}{w_a - w_b}, \overline{P}^n\right)\right\}$
7: end if
end function

---

For solving the above described problem P'$_{SCUS}$(n) an Algorithm 2 (SCUS) defined below is used which is based on dynamic programming (DP). Basically, this approach consists in computing recursively the elements of three arrays V, X, T. Let $m \in \{1, \ldots, M\}$, $j \in \{1, \ldots, K\}$ and $i \geq j$, V[m, j, i] is defined as the optimal value of the objective function $\sum_{i=1}^{K} f_i^n(x_i^n)$ satisfying:

A. Constraints C2', C3' and C3",
B. Variables $x_j^n, \ldots, x_i^n$ are all equal, i.e., $x_j^n = \ldots = x_i^n$,
C. Variables with index $l > i$ are equal to zero, i.e., $x_l^n = 0$,
D. There are at most m active users, i.e., $\mathcal{U}'_n \leq m$.

X[m, j, i] contains the corresponding optimal value of $x_j^n, \ldots, x_i^n$. Note that this is a scalar, as these variables are all equal from criterion (B). These arrays are computed recursively, i.e., their value at index (m, j, i) depends on their value either at (m−1, j−1, j−1), (m, j−1, j−1) or (m, j−1, i). One of these indexes used in the computation of V[m, j, i] and X[m, j, i], is stored in U[m, j, i] to keep track of the optimal allocation on previous variables $x_l^n$, l<j.

---

Algorithm 2 Single-carrier user selection algorithm (SCUS) function SCUS($\mathcal{J}^n$, $\overline{P}^n$, M)

---

1: Initialize arrays V, X, U for j = 1 and m = 1
2: for m = 1 to M and i = 1 to K do
3: $V[m, 1, i] \leftarrow \begin{cases} (f_{1,K}^n(\overline{P}^n), \text{ if } i = K \\ f_{1,i}^n(\overline{P}^n) + f_{i+1,K}^n(0), \text{ else} \end{cases}$
4: X[m, 1, i] ʃ $\overline{P}^n$
5: U[m, 1, i] ʃ (0,0,0)
6: end for
7: for j = 2 to K and i = j to K do
8: $v_P \leftarrow f_{1,i}^n(\overline{P}^n) + f_{i+1,K}^n(0)$
9: $v_0 \leftarrow V[1, j − 1, j − 1]$
10: if $v_P \leq v_0$ then
11: V[1, j, i] ← $v_P$
12: X[1, j, i] ← $\overline{P}^n$
13: U[1, j, i] ← (1, 1, i)
14: else
15: V[1, j, i] ←21? vo
16: X[1, j, i] ← 0
17: U[1, j, i] ← (1, j − 1, j − 1)
20: Compute V, X, U fo m ≤ M and j ≤ i ≤ K
21: for j = 2 to K and i = j to K and m = 2 to M do
22: $x^* \leftarrow$ MaxF(j, i,$\mathcal{J}^n$, $\overline{P}^n$)
23: $v_0 \leftarrow$ V[m, j − 1, j − 1]
24: $v_1 \leftarrow$ V[m − 1, j − 1, j − 1] + $f_{j,i}^n(x^*) - f_{j,i}^n(0)$
25: $v_2 \leftarrow$ V[m, j − 1, i]
26: if 0 < $x^*$ < X[m − 1, j − 1, j − 1] and 0 $v_1 \geq v_2, v_0$ then
27: V[m, j, i] ← $v_1$
28: X[m, j, i] ← $x^*$
29: U[m, j, i] ← (m − 1, j − 1, j − 1)
30: else if $v_2 \geq v_0$ then
31: V[m, j, i] ← $v_2$
32: X[m, j, i] ← X[m, j − 1, i]
33: U[m, j, i] ← (m, j − 1, i)
34: else
35: V[m, j, i] ← $v_0$
36: X[m, j, i] ← 0
37: U[m, j, i] ← (m, j − 1, j − 1)
38: end if
39: end for
40: Retrieve the optimal solution $x^n$
41: $x_1^n, ..., x_K^n \leftarrow 0$
42: (m, j, i) ← (M, K, K)
43: repeat
44: $x_j^n, ..., x_i^n \leftarrow$ X[m, j, i]
45: (m, j, i) ← U[m, j, i]
46: until (m, j, i) = (0,0,0)
47: return $x^n$
end function

---

A line-by-line description and analysis of Algorithm 2 is given below.

Lines 1 to 6: The arrays for index (m, j, i) are initialized with j=1, 1≤i≤K and m∈{1, . . . , M}. It is direct from the above definition that $x_1^n = \ldots = x_i^n$ and $x_{i+1}^n = \ldots = x_{K+1}^n = 0$. It is knowns from Lemma 2 that the maximum is obtained for $x_1^n = \ldots = x_i^n =$ MaxF(1, i, $\mathcal{J}^n$, $\overline{P}^n$)=$\overline{P}^n$, which explains the assignment at lines 3 and 4. At line 5, U[m, 1, i] gets (0,0,0) as there is no previous index.

Lines 7 to 19: The arrays for m=1 and 2≤j≤i≤K are initialized. Since $\mathcal{U'}_n$≤m=1 and C2', C3', C3" have to be satisfied, the optimal is achieved by $x_1^n = \ldots = x_l^n = \overline{P}^n$ and $x_{l+1}^n = \ldots = x_{K+1}^n = 0$, for a certain l≤i. Suppose that l=i, then the value of V[m, j, i] is given by $v_P$ at line 8. Otherwise l<i, and V[m, j, i] is given by $v_0$ at line 9. The maximum between $v_P$ and $v_0$ is assigned to V[m, j, i] at lines 10 to 18. The corresponding allocation is stored in X[m, j, i].

Lines 20 to 39: The elements of V, X, U are recursively computed for j=2 to K, i=j to K, and m=2 to M. At index (m, j, i), there are three potential cases to consider:

Case $v_0$: Suppose that user i is inactive, then $x_i^n = x_{i+1}^n$ is obtained by definition of $\mathcal{U'}_n$. If follows from (B) and (C) that $x_j^n = \ldots = x_{K+1}^n = 0$. Thus, V[m, j, i]=V[m, j−1, j−1], which is denoted by $v_0$ at line 24.

Case $v_1$: Assume that users i and j−1 are both active. Let $x^*$=MaxF(j, i, $\mathcal{J}^n$, $\overline{P}^n$) as in line 22. Suppose for the sake of contradiction that $x^* x_{j-1}^n$. According to Lemma 2, $f_{j,i}^n$ is increasing in [0, $x^*$]. As a consequence, the optimal satisfying C3' is achieved for $x_j^n = x_{j-1}^n$, which contradicts with the fact that j−1 is active, i.e., $x_{j-1}^n > x_j^n$. It is derived from $x_{j-1}^n = X[m-1, j-1, j-1]$ that:

$$x^* < X[m-1, j-1, j-1]. \quad (4)$$

Suppose for the sake of contradiction that $x^* = 0$. It is knowns from Lemma 2 that $f_{j,i}^n$ decreases in [$x^*$, +∞). Therefore, the optimal satisfying C3' and C3" is achieved for $x_i^n = 0$, which contradicts with the fact that i is active, i.e., $x_i^n > x_{i+1}^n = 0$. It is deduced that:

$$x^* > 0. \quad (5)$$

If (4) and (5) are satisfied, then V[m, j, i]=$v_1 \cdot v_1$ is the sum of the optimal objective with at most m−1 active users from indexes 1 to j−1, i.e., V[m−1, j−1, j−1], and the individual contribution of the active user i, i.e., $f_{j,i}^n$(MaxF(j, i, $\mathcal{J}^n$, Pn))−$f_{j,i}^n$(0).

Case $v_2$: If i is active and j−1 is inactive, then $x_{j-1}^n = x_j^n$ by definition of U'$_n$.

Therefore, V[m, j, i] is given by $v_2$=V[m, j−1, i] at line 25.

The maximum between $v_0$, $v_1$ and $v_2$ is assigned to V[m, j, i], and the corresponding allocation is stored in X[m, j, i]. $v_1$ is only chosen if, in addition, conditions (4) and (5) are true as shown in line 26.

Lines 40 to 47: Finally, V[M, K, K] is by definition the optimal value of P. The corresponding optimal allocation $x^n$ is retrieved in lines 43 to 46 by finding recursively the indexes (m, j, i) in U used to construct the solution until reaching (0,0,0). At each iteration, X[m, j, i] is assigned to variables $x_j^n, \ldots, x_i^n$.

The optimality and complexity of algorithm SCUS is determined in the following theorem 3.

Given a subcarrier n∈$\mathcal{N}$, a power budget $\overline{P}^n$ and M≥1, algorithm SCUS computes the optimal single-carrier power control and user selection of P'$_{SCUS}$(n). Its worst case computational complexity is O(MK$^2$). This can be proved as follows.

Regarding the complexity analysis, the computational complexity mainly comes from the computation of V, X and U in lines 20 to 39. It requires (M−1)$\Sigma_{j=2}^K$ K+1 j=O(MK$^2$) iterations. Each iteration has a constant number of operations. Thus, the overall worst case computational complexity is O(MK$^2$). Regarding optimality, a detailed analysis of Algorithm 2 shows that SCUS's construction of V, X, U indeed match their definition. In particular, V[M, K, K] is by definition the optimal value of P'$_{SCUS}$(n). The corresponding optimal allocation $x^n$ is retrieved in lines 40 to 46.

Next, the MCPC procedure is described.

In a first example, it is assumed that the multi-carrier power control sub-problem P'$_{MCPC}$ consists in maximizing the WSR taking as input a fixed subcarrier allocation $\mathcal{U'}_n$, for all n∈$\mathcal{N}$, so that constraint C4' can be ignored. Since inactive users k∉$\mathcal{U}_n$ on each subcarrier n∈$\mathcal{N}$ have no contribution on the data rates, i.e., $p_k^n = 0$ and $R_k^n = 0$, they are removed in the definition of P for the study of this sub-problem. Without loss of generality, P is transformed to P' wherein the remaining active users on each subcarrier n are indexed by $i_n \in \{1_n, \ldots, |\mathcal{U}'_n|_n\}$. P'$_{MCPC}$ is formulated as a two-stage optimization problem. The first-stage is:

$$\underset{\overline{P}}{\text{maximize}} \sum_{n \in \mathcal{N}} F^n(\overline{P}^n) \qquad (P'_{MCPC})$$

$$\text{subject to } \overline{P}^n \in \mathcal{F},$$

where $\overline{P}^n$, for $n \in \mathcal{N}$, are intermediate variables representing each subcarrier's power budget. $\overline{P} \triangleq (\overline{P}^1, \ldots, \overline{P}^N)$ denotes the power budget vector. The feasible set $$\mathcal{F} \triangleq \{\overline{P}: \Sigma_{n \in \mathcal{N}} \overline{P}^n \le P_{max} \text{ and } 0 \le \overline{P}^n \le P_{max}{}^n, n \in \mathcal{N}\} \qquad (6)$$

is chosen to satisfy C1' and C2'.

$F^n(\overline{P}^n)$ is the optimal value of the second-stage (single-carrier power control SCPC):

$$F^n(\overline{P}^n) = \max_{x_{i_n}^n} \sum_{i=1}^{|\mathcal{U}'_n|} f_{i_n}^n(x_{i_n}^n) \qquad (P'_{SCPC})$$

$$\text{subject to } x_{1_n}^n \le \overline{P}^n,$$

$$x_{1_n}^n \ge x_{(i+1)_n}^n, i \in \{1, \ldots, |\mathcal{U}'_n|\},$$

$$x_{(|\mathcal{U}'_n|+1)_n}^n = 0.$$

The first-stage P'$_{MCPC}$ consists in optimizing the allocated power budget $\overline{P}^n$ among subcarriers $n \in \mathcal{N}$. While the second-stage P'$_{SCPC}$ performs power allocation on each subcarrier n, with a given allocation $\mathcal{U}'_n$ and power budget $\overline{P}^n$.

The second-stage P'$_{SCPC}$ can be solved, for example, by using the following Algorithm 3 (SCPC).

---

Algorithm 3 Single-carrier power control algorithm (SCPC)

--- function SCPC($\mathcal{J}^n$, $\mathcal{U}'_n$, $\overline{P}^n$)
1: for i = 1 to $|\mathcal{U}'_n|$ do
2: Compute the optimal of $f_{i_n}^n$
3: x* ← MaxF($i_n$, $i_n$, $\mathcal{J}^n$, $\overline{P}^n$)
4: Modify x* if this allocation violates constraint C3'
5: j ← i − 1
6: while $x_{j_n}^n$ < x* and j ≥ 1 do
7: x* ← MaxF($j_n$, $i_n$, $\mathcal{J}^n$, $\overline{P}^n$)
8: j ← j − 1
9: end while
10: $x_{(j+1)_n}^n, \ldots, x_{i_n}^n$ ← x*
11: end for
12: return $x_{1_n}^n, \ldots, x_{|\mathcal{U}'_n|_n}^n$
end function

---

The idea is to iterate over variables $x_{i_n}^n$ for i=1 to $|\mathcal{U}'_n|$, and compute their optimal value x*=MaxF($i_n$, $i_n$, $\mathcal{J}^n$, $\overline{P}^n$) at line 3. If the current allocation satisfies constraint C3', then $x_{i_n}^n$ gets value x*. Otherwise, the algorithm backtracks at line 6 and finds the highest index j∈{2, …, i−1} such that $x_{(j-1)_n}^n \ge$ MaxF($j_n$, $i_n$, $\mathcal{J}^n$, $\overline{P}^n$). Then, variables $x_{j_n}^n, \ldots, x_{i_n}^n$ are set equal to MaxF ($j_n$, $i_n$, $\mathcal{J}^n$, $\overline{P}^n$) at line 10. The optimality and complexity of this algorithm 3 are presented in the following Theorem 4.

Theorem 4: Given subcarrier $n \in \mathcal{N}$ and a power budget $\overline{P}^n$, algorithm SCPC computes the optimal single-carrier power control. Its worst case computational complexity is $O(|\mathcal{U}'_n|^2)$.

This can be proved as follows. Regarding the complexity analysis, at each for loop iteration i, the while loop at line 6 has at most i iterations. Thus, the worst case complexity is proportional to $\Sigma_{i=1}^{|\mathcal{U}'_n|}$ i=$O(|\mathcal{U}'_n|^2)$. Regarding the optimality, without loss of generality, it is supposed that the $x_{i_n}^n$'s are initialized to zero. It can be proved by induction that at the end of each iteration i at line 10, the following induction hypotheses are true:

$H_1(i): \Sigma_{l=1}^i f_{l_n}^n$ is maximized by $x_{1_n}^n, \ldots, x_{i_n}^n$, $H_2$ (i): Constraint C3' is satisfied, i.e., $x_{1_n}^n \ge \ldots \ge x_{i_n}^n \ge 0$, $H_3(i)$: For any 1≤i, there exists q≤l and q'≥l such that variables $x_{q_n}^n, \ldots, x_{q'_n}^n$ are equal and optimal for $f_{q_n q'_n}^n$. In addition, $f_{q_n q'_n}^n$ is decreasing for any $y_{q_n}^n, \ldots, y_{q'_n}^n \ge x_{q_n}^n, \ldots, x_{q'_n}^n$ such that $\overline{P}^n \ge x_{q_n}^n \ge \ldots \ge x_{q'_n}^n$.

$x_{K+1}$=0 is set, which satisfies C3". C2' is always satisfied since algorithm MaxF gives values in [0, $\overline{P}^n$].

This is based on the following: For i=1, x* computed at line 3 is indeed the optimal of $f_{i_n}^n$. The while loop has no effect since j=0<1, therefore $x_{1_n}^n \leftarrow$ x* and statements 1(i) and 2(i) are true. Since $f_{1_n}^n$ is decreasing for $x_{1_n}^n \in $[x*, $\overline{P}^n$] according to Lemma 2, $H_3$ (i) is also satisfied for l=1 with q=q'=1. Assume that $x_{1_n}^n(i-1), \ldots, x_{(i-1)_n}^n(i-1)$ are the variables verifying $H_1(i-1)-H_3(i-1)$ at iteration i−1<K. Let the variables at iteration i be $x_{1_n}^n, \ldots, x_{i_n}^n$.

If by assigning x*=MaxF ($i_n$, $i_n$, $\mathcal{J}^n$, $\overline{P}^n$) to $x_{i_n}^n$, it satisfies C3', then $E_{i=1}^{i-1} f_{l_n}^n(x_{l_n}^n(i-1))+f_{i_n}^n(x_{i_n}^n)$ is optimal due to $H_1(i-1)$ and the fact that $x_{i_n}^n$ is maximal for $f_{i_n}^n$. The iteration terminates with $x_{i_n}^n \leftarrow$ x* and $x_{i_n}^n = x_{l_n}^n(i-1)$ for all l<i. Thus, $H_1(i)$ and $H_2(i)$ are satisfied and $H_3$ (i)s true for index l=i with q=q'=i.

Otherwise if $x_{i_n}^n$=x* violates C3', $x_{j_n}^n(i-1)$<x* at the while loop's first iteration at line 6 with j←i−1. It is deduced from the monotonicity of $f_{l_n}^n$, l≤i, that:

$$x_{i_n}^n \ge x_{j_n}^n(i-1). \qquad (7)$$

It is known from $H_3$ (i−1) there exists q≤j such that $x_{q_n}^n(i-1), \ldots, x_{j_n}^n$ (i−1) are equal and optimal for $f_{q_n j_n}^n$ and that $f_{q_n j_n}^n$ is decreasing for any increase in these variables. It follows from Eqn. (7) that the optimal is reached at $x_{q_n}^n = \ldots = x_{j_n}^n = x_{i_n}^n$.

As a consequence, the maximum of $\Sigma_{l=q}^i f_{l_n}^n = f_{q_n, i_n}^n$ is given by x*←MaxF($q_n$, $i_n$, $\mathcal{J}^n$, Pn). Then, the algorithm sets $x_{q_n}^n, \ldots, x_{i_n}^n \leftarrow$ x* and $x_{l_n}^n = x_{l_n}^n(i-1)$ for all l<q. $\Sigma_{l=q}^i f_{l_n}^n(x_{l_n}^n)$ is optimal by construction. $\Sigma_{i=q}^{q-1} f_{l_n}^n(x_{l_n}^n)$ remains unchanged and optimal by induction hypothesis at iteration q−1. Therefore, 1(i) is true. Property $H_3(i)$ remains unchanged on l<q, and is also true for any l∈{q, …, i} with indexes q and q'=i. The only property that may not be satisfied at this point is $H_2(i)$, since $x_{(q-1)_n}^n$<x* is possible.

This reasoning is continued until reaching the highest index j∈{2, …, i−1} such that $x_{(j-1)_n}^n \ge$ x*=MaxF($j_n$, $i_n$, $\mathcal{J}^n$, $\overline{P}^n$). It is known that this index exists since all variables are upper bounded by $\overline{P}^n$ and $x_{1_n}^n = \overline{P}^n$ due to Lemma 2. Properties $H_1(i)$ and $H_3(i)$ remain true by the above construction. Finally, $H_2(i)$ is satisfied at this point.

The convexity of P'$_{MCPC}$ is discussed in the following Lemma 5. That is, it is shown that $\mathcal{F}$ is a convex set and $\Sigma_{n \in \mathcal{N}} F^n$ is concave with respect to $\overline{P} \in \mathcal{F}$.

This is proved as follows. The convexity of $\mathcal{F}$ is direct from its definition in Eqn. (6). It is now proved that each $F^n$ is concave with respect to $\overline{P}^n \in [0, P_{max}^n]$, $n \in \mathcal{N}$. Let $x_{1_n}^n, \ldots, x_{|\mathcal{U}'_n|_n}^n$ be the allocation returned by SCPC($\mathcal{J}^n$, $\mathcal{U}'_n$, $P_{max}^n$). As can be seen in Algorithm 3, the only impact of $\overline{P}^n$ on the allocation is through MaxF thresholding (see lines 4 and 6 in Algorithm 1). Hence, the allocation returned by SCPC($\mathcal{J}^n$, $\mathcal{U}'_n$, $\overline{P}^n$) is equal to min{$x_{1_n}^n$, $\overline{P}^n$}, ..., min{$x_{|\mathcal{U}_n|_n}^n$, $\overline{P}^n$}. Besides, the variables can be divided in consecutive groups of the form $x_{q_n}^n$, ..., $x_{q'_n}^n$, such that $x_{q_n}^n = \ldots = x_{q'_n}^n$ is optimal for $f_{q_n,q'_n}^n$ according to $H_3$ of Theorem 4's proof. Lemma 2 implies that $f_{q_n,q'_n}^n$ is concave on [0, $x_{q_n}^n$], therefore $f_{q_n,q'_n}^n$ (min{$x_{q_n}^n$, $\overline{P}^n$}) is concave in $\overline{P}^n \in [0, P_{max}^n]$. It follows by summation that $F^n$ and $\Sigma_{n \in \mathcal{N}} F^n$ are concave, which completes the proof.

That is, according to Lemma 5, $\Sigma_{n \in \mathcal{N}} F^n$ is concave on the convex feasible set $\mathcal{F}$. Hence, the optimal multi-carrier power allocation P can be computed efficiently using projected gradient descent. A corresponding MCPC scheme is described in Algorithm 4.

---
Algorithm 4
---

Function MCPC(($\mathcal{J}^n)_{n \in \mathcal{N}}$, ($\mathcal{U}'_n)_{n \in \mathcal{N}}$, $P_{max}$, $P_{max}^n$, $\mathcal{N}$, $\varepsilon$)
1: Let $\overline{P} \leftarrow 0$ be the starting point
2: repeat
3: Save the previous vector $\overline{P}' \leftarrow \overline{P}$
4: Determine a search direction $\Delta \leftarrow \nabla \Sigma_{n \in \mathcal{N}} F^n(\overline{P}^n)$
5: Choose a step size $\alpha$
6: Update $\overline{P} \leftarrow$ projection of $\overline{P} + \alpha \Delta$ on $\mathcal{F}$
7: until $||\overline{P}' - \overline{P}||_2^2 \leq \varepsilon$
8: for $n \in \mathcal{N}$ do
9: $x_{1_n}^n, \ldots, x_{|\mathcal{U}_n|_n}^n \leftarrow$ SCPC($\mathcal{J}^n$, $\mathcal{U}'_n$, $\overline{P}^n$)
10: end for
11: return ($x_{1_n}^n, \ldots, x_{|\mathcal{U}_n|_n}^n)_{n \in \mathcal{N}}$
end function
function $F^n(\overline{P}^n) \triangleq F^n(\mathcal{J}^n, \mathcal{U}'_n, \overline{P}^n)$
12: $x_{1_n}^n, \ldots, x_{|\mathcal{U}_n|_n}^n \leftarrow$ SCPC($\mathcal{J}^n$, $\mathcal{U}'_n$, $\overline{P}^n$)
13: return $\Sigma_{i=1}^{|\mathcal{U}_n|} f_{i_n}^n(x_{i_n}^n)$
end function

---

It is to be noted that in Algorithm 4 the second-stage optimal value $F^n(\overline{P}^n)$, defined in $P'_{SCPC}$, is determined using SCPC as described in the auxiliary function in lines 12 to 13 of Algorithm 4. The search direction at line 4 can be found either using numerical methods or an exact gradient formula (see also the proof of Lemma 5). Note that the step size a at line 5 can be tuned by backtracking line search or exact line search, for example. The latter is adopted to perform simulations, as discussed below. The projection of $\overline{P} + \alpha \Delta$ on the simplex $\mathcal{F}$ at line 6 can be computed efficiently, the details of its implementation are omitted here.

The optimality and complexity of algorithm MCPC are discussed in the following Theorem 6.

Theorem 6: Given a subcarrier allocation such that $|\mathcal{U}'_n| \leq M$, for all $n \in \mathcal{N}$, algorithm MCPC converges to the optimal solution of P in $O(\log(1/\varepsilon))$ iterations, where $\varepsilon$ is the error tolerance. Each iteration requires $O(NM^2)$ basic operations.

This is proved as follows. From Lemma 5 and classical convex programming results, it is clear that projected gradient descent converges to the optimal multi-carrier power control (MCPC) in $O(\log(1/\varepsilon))$ iterations. Each iteration requires to compute SCPC($\mathcal{J}^n$, $\mathcal{U}'_n$, $\overline{P}^n$), for $n \in \mathcal{N}$. Thus, it is derived from Theorem 4 and $|\mathcal{U}'_n| \leq M$ that each iteration's worst case complexity is $O(NM^2)$.

Figure 2:
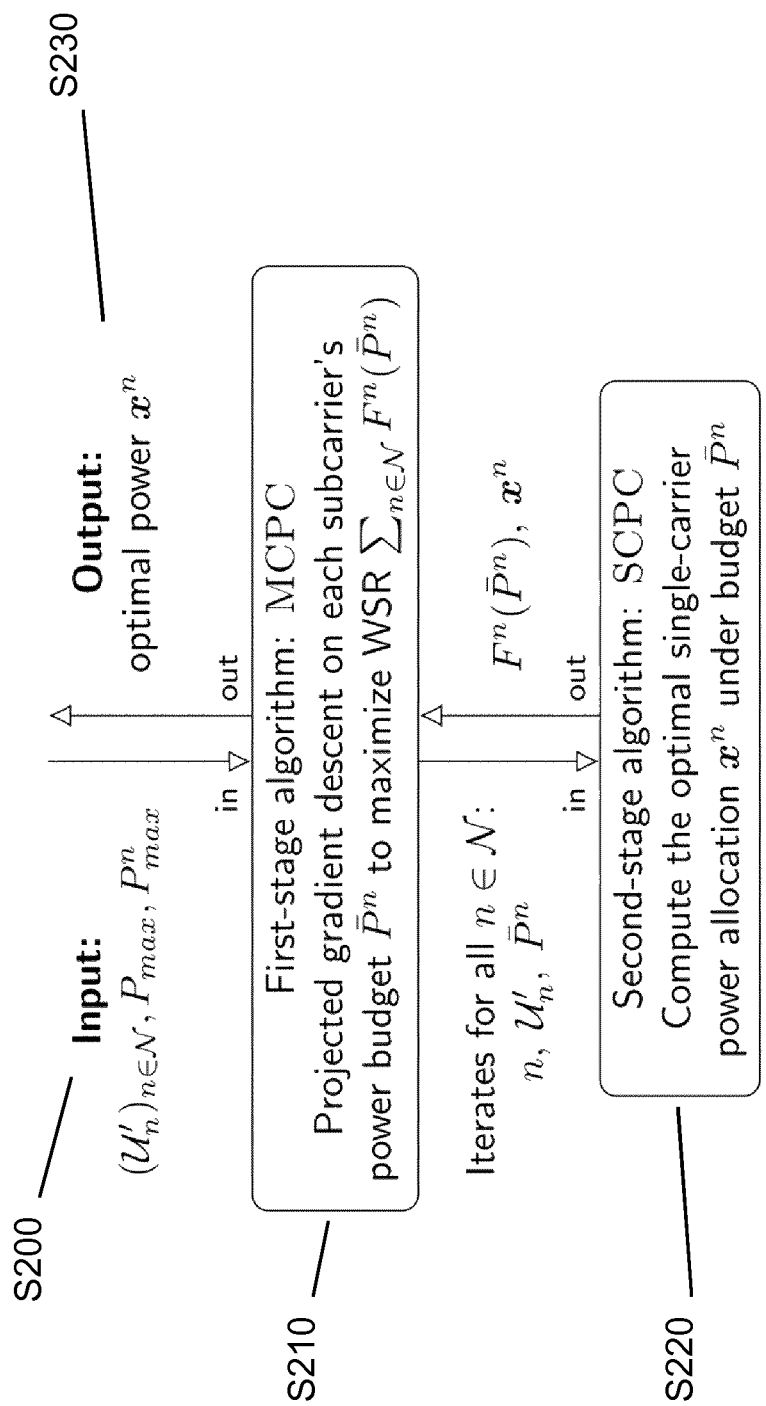
FIG. 2 shows a diagram for explaining a MCPC procedure according to some examples of embodiments.

FIG. 2 gives an overview of an example for the nested optimization that is designed to solve $P'_{MCPC}$, wherein the above described Algorithms 3 and 4 are employed. It is to be noted that the example of FIG. 2 represents a case where the subcarrier allocation is given as a parameter.

As shown in FIG. 2, in S200, input for the algorithms is the subcarrier allocation $|\mathcal{U}'_n|_n$, the maximum power budget $P_{max}$ and the maximum power budget per carrier $P_{max}^n$.

These parameters are input into the first stage algorithm MCPC (described in further detail below). Here, in S210, a projected gradient descent on each subcarrier's power budget $\overline{P}^n$ is applied in order to maximize the WSR $\Sigma_{n \in \mathcal{N}} F^n(\overline{P}^n)$.

The output of the first stage algorithm representing an iteration for all subcarriers $n \in \mathcal{N}$ of n, allocation $\mathcal{U}'_n$ and power budget $\overline{P}^n$ is input into the second-stage algorithm SCPC. Here, in S220, the optimal single-carrier power allocation $x^n$ under power budget $\overline{P}^n$ is computed.

The output of the second-stage algorithm SCPC, i.e. $F^n(\overline{P}^n)$ and $x^n$, are returned to the first-stage algorithm MCPC. Here computation of the received input is effected leading to an output of the optimal power $x^n$ for the respective subcarrier which is provided in S230. It is to be noted that the first-stage algorithm MCPC can use the result achieved by processing (computing) the input of the second-stage algorithm SCPC for the next iteration (i.e. first-stage algorithm MCPC and second-stage algorithm SCPC form a loop), e.g. in case the condition in line 7 of algorithm 4 is not fulfilled.

Next, a further example of embodiments is described which is related to the multi-carrier joint subscriber and power allocation (JSPA) procedure indicated above.

As described above, JSPA represents efficient heuristic joint subcarrier and power allocation scheme which combines MCPC and SCUS. That is, basically, JSPA is similar to the two-stage MCPC approach depicted in FIG. 2. However, there are some differences which will be discussed in the following.

One difference is that subcarrier allocation is no longer provided as input. Instead, it has to be optimized in the second-stage. To this end, the second-stage SCPC algorithm (i.e. algorithm 3 used in the example of FIG. 2) is replaced by the optimal single-carrier user selection algorithm SCUS according to algorithm 2 discussed above. Due to this, the MCPC algorithm, which is described above as Algorithm 4, is to be modified into Algorithm 4' as described below.

---
Algorithm 4'
---

Function MCPC( ($\mathcal{J}^n)_{n \in \mathcal{N}}$, M, $P_{max}$, $P_{max}^n$, $\mathcal{N}$, $\varepsilon$)
1: Let $\overline{P} \leftarrow 0$ be the starting point
2: repeat
3: Save the previous vector $\overline{P}' \leftarrow \overline{P}$
4: Determine a search direction $\Delta \leftarrow \nabla \Sigma_{n \in \mathcal{N}} F^n(\overline{P}^n)$
5: Choose a step size $\alpha$
6: Update $\overline{P} \leftarrow$ projection of $\overline{P} + \alpha \Delta$ on $\mathcal{F}$
7: until $||\overline{P}' - \overline{P}||_2^2 \leq \varepsilon$
8: for $n \in \mathcal{N}$ do
9: $x_{1_n}^n, \ldots, x_{|\mathcal{U}_n|_n}^n \leftarrow$ SCUS($\mathcal{J}^n$, M, $\overline{P}^n$)
10: end for
11: return($x_{1_n}^n, \ldots, x_{|\mathcal{U}_n|_n}^n)_{n \in \mathcal{N}}$
end function
function $F^n(\overline{P}^n) \triangleq F^n(\mathcal{J}^n, M, \overline{P}^n)$
12: $x_{1_n}^n, \ldots, x_{|\mathcal{U}_n|_n}^n \leftarrow$ SCUS($\mathcal{J}^n$, M, $\overline{P}^n$)
13: return $\Sigma_{i=1}^{|\mathcal{U}_n|} f_{i_n}^n(x_{i_n}^n)$
end function

---

Figure 3:
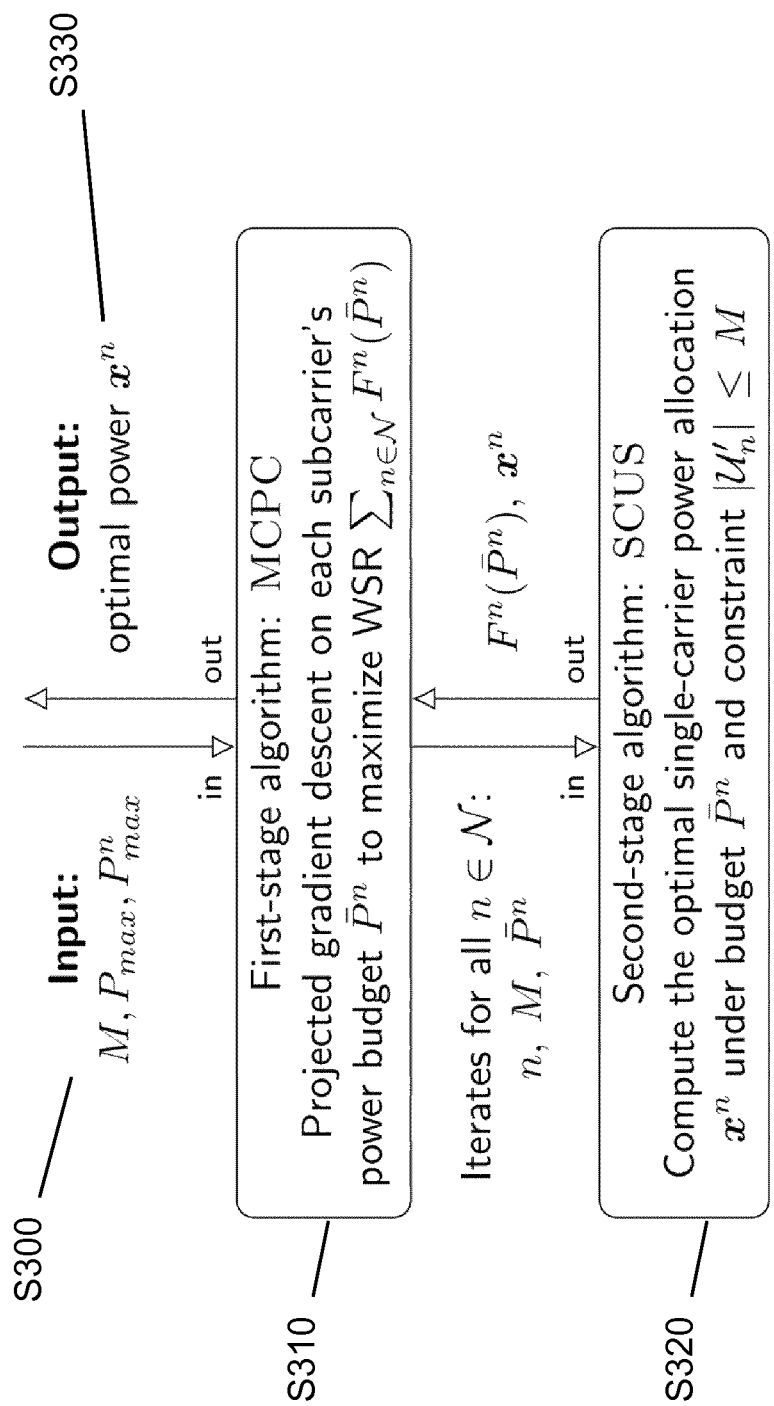
FIG. 3 shows a diagram for explaining a JSPA procedure according to some examples of embodiments.

FIG. 3 gives an overview of an example for the JSPA procedure, wherein the above described Algorithms 2 and 4' are employed. It is to be noted that the example of FIG. 3 represents a case where the subcarrier allocation is not given as a parameter.

As shown in FIG. 3, in S300, input for the algorithms is the number of multiplexed users per subcarrier M, the maximum power budget $P_{max}$ and the maximum power budget per carrier $P_{max}^n$. These parameters are input into the first stage algorithm MCPC (described above). Here, in S310, a projected gradient descent on each subcarrier's power budget $\bar{P}^n$ is applied in order to maximize the WSR $\Sigma_{n \in \mathcal{N}} F^n(\bar{P}^n)$.

The output of the first-stage algorithm representing an iteration for all subcarriers $n \in \mathcal{N}$ of n, M and power budget $\bar{P}^n$ is input into the second-stage algorithm SCUS. Here, in S320, the optimal single-carrier power allocation $x^n$ under power budget $\bar{P}^n$ is computed under the constraint $|u'_n| \leq M$.

The output of the second-stage algorithm SCUS, i.e. $F^n(\bar{P}^n)$ and $x^n$, are returned to the first-stage algorithm MCPC. Here, computation of the received input is effected leading to an output of the optimal power $x^n$ for the respective subcarrier which is provided in S330. It is to be noted that the first-stage algorithm MCPC can use the result achieved by processing (computing) the input of the second-stage algorithm SCUS for the next iteration (i.e. first-stage algorithm MCPC and second-stage algorithm SCUS form a loop), e.g. in case the condition in line 7 of algorithm 4' is not fulfilled.

It is to be noted that although SCUS is optimal, the returned $F^n(\bar{P}^n)$ is no longer concave. As a consequence, JSPA is not guaranteed to converge to a global maximum. Each iteration of JSPA requires to compute SCUS($J^n$, $\bar{P}^n$, M), for $n \in \mathcal{N}$. Thus, from Theorem 3, it is derived that each iteration's worst case complexity is $O(NMK^2)$. Nevertheless, as shown in the following by numerical results, it achieves near-optimal weighted sum-rate performance with low complexity.

In the following, numerical results of a comparison between a procedure based on principles of examples of embodiments, as described above, and a procedure based on known methods, such as LDDP and FTPC, are discussed. That is, evaluation results of the WSR, user fairness performance and computational complexity of the proposed JSPA procedure are obtained through numerical simulations, wherein these simulation results are then compared with the near-optimal high complexity benchmark scheme LDDP and FTPC with greedy subcarrier allocation.

As simulation parameters, the following settings are considered. A cell (e.g. corresponding to cell 21 of FIG. 1) of diameter 500 meters, with one BS (i.e. BS 20) located at its center and K users (e.g. UEs 10, 12, 13) distributed uniformly at random in the cell, is used as a basis. The number of users K in the simulation varies from 5 to 30, and the number of subcarriers is N=10, for example. Simulation results are indicated in the following as average values obtained over 1000 random instances. Simulation parameters and channel model are summarized in Table 1.

TABLE 1

| Simulation parameters | |
| --- | --- |
| Parameters | Value |
| Cell radius | 250 m |
| Minimum distance from user to BS | 35 m |
| Carrier frequency | 2 GHz |
| Path loss model | 128.1 + 37.6log$_{10}$d dB, d is in km |
| Shadowing | Log-normal, 8 dB standard deviation |
| Fading | Rayleigh fading with variance 1 |
| Noise power spectral density | −174 dBm/Hz |
| System bandwidth W | 5 MHz |
| Number of subcarriers N | 10 |
| Number of users K | 5 to 30 |
| Total power budget P$_{max}$ | 1 W |
| Error tolerance ε | 10$^{-4}$ |
| Parameter M | 1 (OMA), 2 and 3 (NOMA) |

Figure 4:
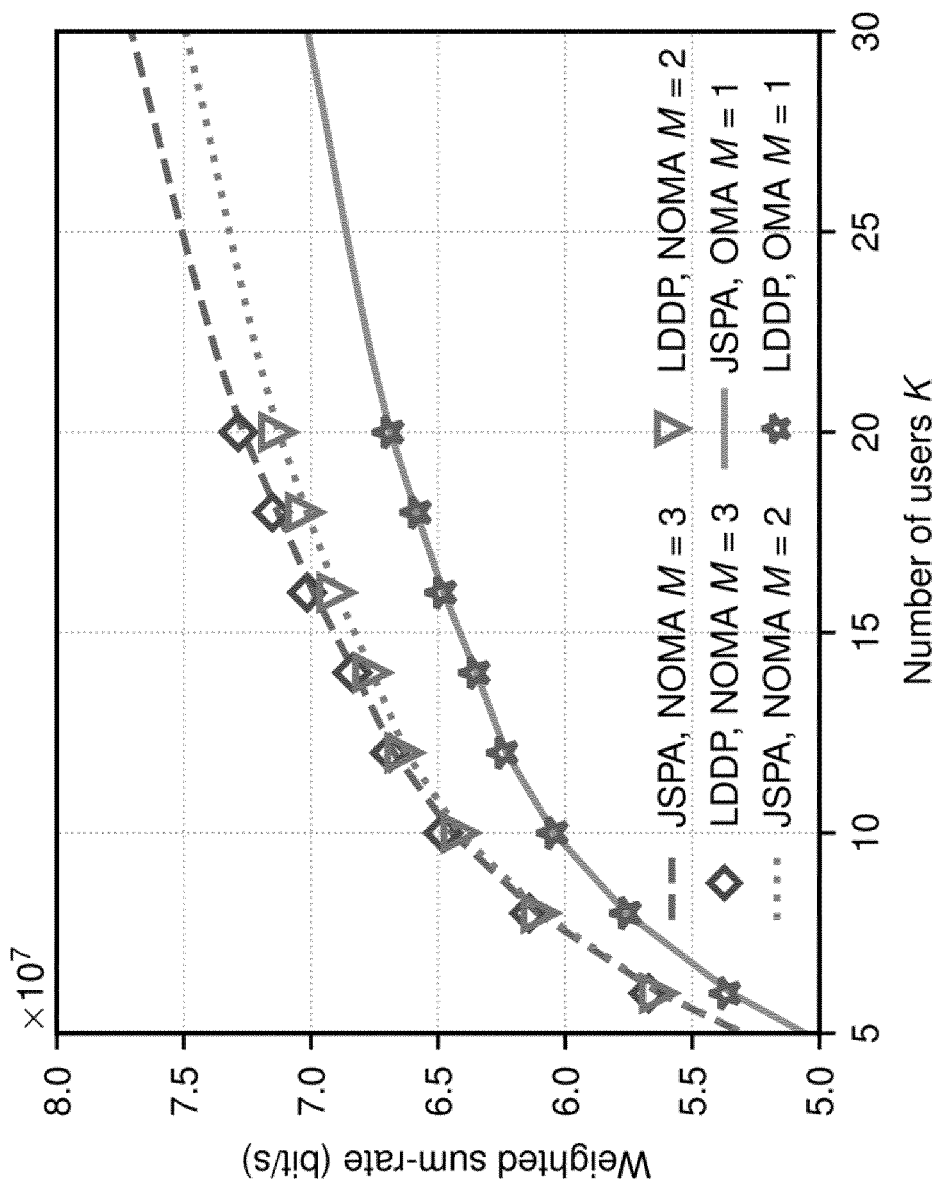
FIG. 4 shows a diagram for illustrating a comparison of results achievable by implementing a JSPA procedure according to some examples of embodiments and results achievable by a LDDP procedure.
Figure 5:
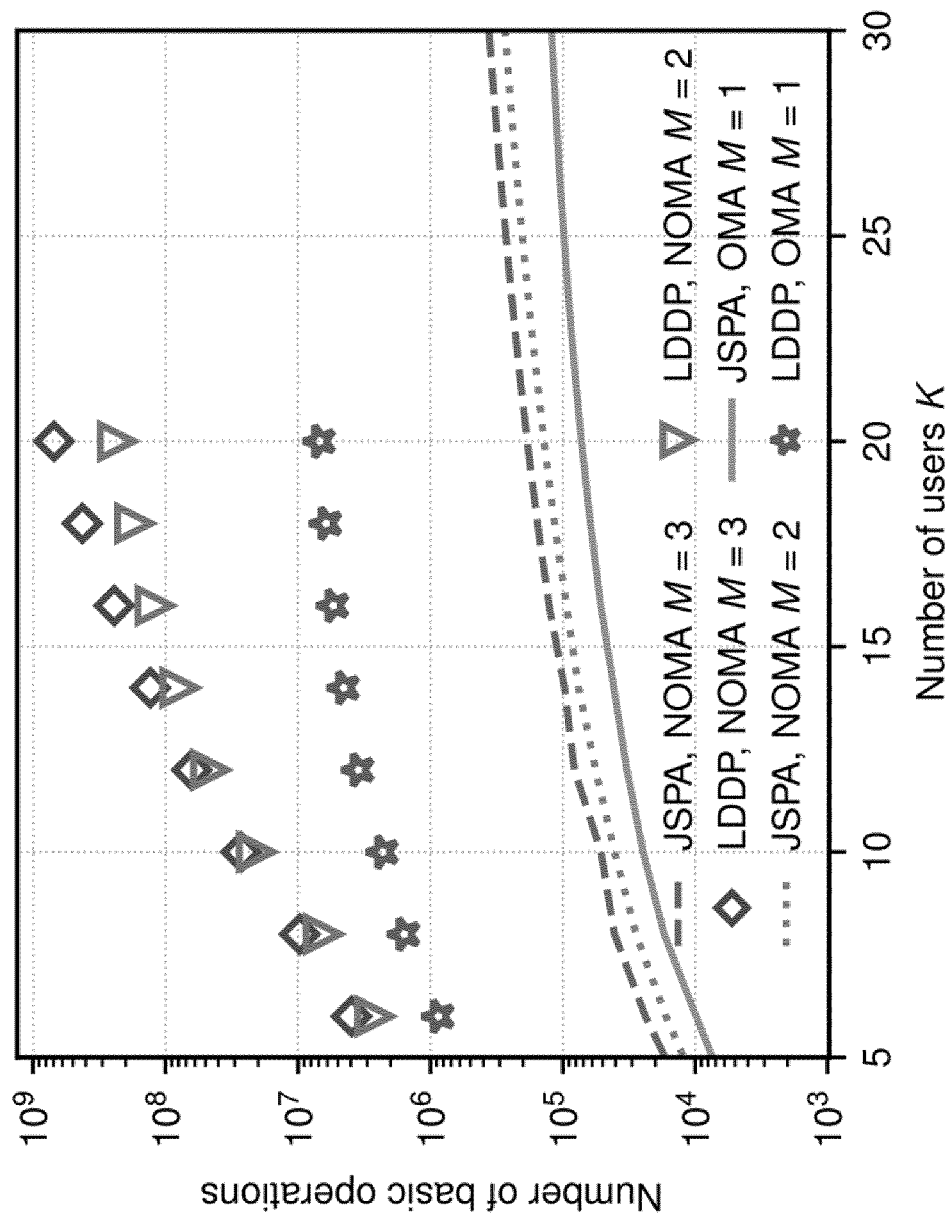
FIG. 5 shows a diagram for illustrating a comparison of results achievable by implementing a JSPA procedure according to some examples of embodiments and results achievable by a LDDP procedure.

FIGS. 4 and 5 illustrate diagrams showing a comparison of results achievable by implementing the JSPA procedure as depicted, for example, in FIG. 3 according to some examples of embodiments and results achievable by using the LDDP procedure. Specifically, in FIG. 4, the WSR of JSPA and LDDP for different systems, i.e., OMA with M=1, NOMA with M=2 and M=3 is shown in relation to the number of users K, while in FIG. 5, the complexity of JSPA and LDDP for different systems, i.e., OMA with M=1, NOMA with M=2 and M=3 is shown by means of the number of basic operations in relation to the number of users K. It is to be noted that weights w are generated uniformly at random in [0,1].

It is to be noted that the LDDP procedure requires to discretize the total power budget P$_{max}$ into J power levels. In the simulation forming the basis of FIGS. 4 and 5, J=100 is chosen. Due to the high computational complexity of LDDP, simulation is conducted only for K=5 to 20.

As can be seen in FIG. 4, the performance loss of JSPA compared to LDDP is less than 0.8% for any number of users K. This indicates that JSPA also achieves near-optimal WSR, close to that of LDDP. In addition, the performance gain of NOMA systems compared to OMA is 7% for M=2 and 10% for M=3.

In FIG. 5, the number of basic operations (additions, multiplications, comparisons) performed by each scheme is counted, which reflects their computational complexity. As expected from Theorem 4, the complexity of JSPA increases linearly with M (there is a constant difference between the curves of JSPA with M=1, 2 and 3 in the semi-log plot). JSPA has low complexity, it runs within seconds on a common computer for K≤30, whereas LDDP requires 1600 times more operations for K=20 and M=2.

Figure 6:
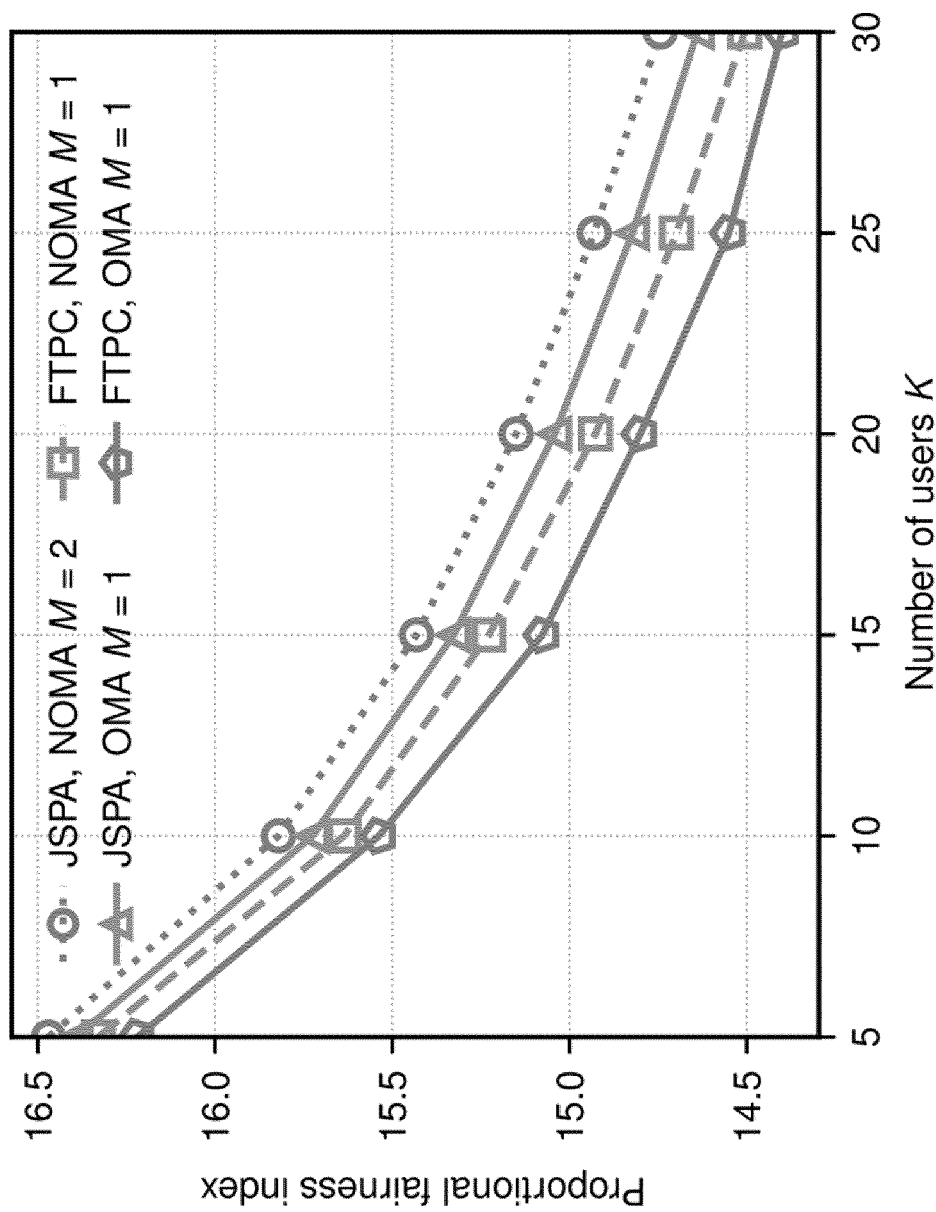
FIG. 6 shows a diagram for illustrating a comparison of results achievable by implementing a JSPA procedure according to some examples of embodiments and results achievable by a FTPC procedure.
Figure 7:
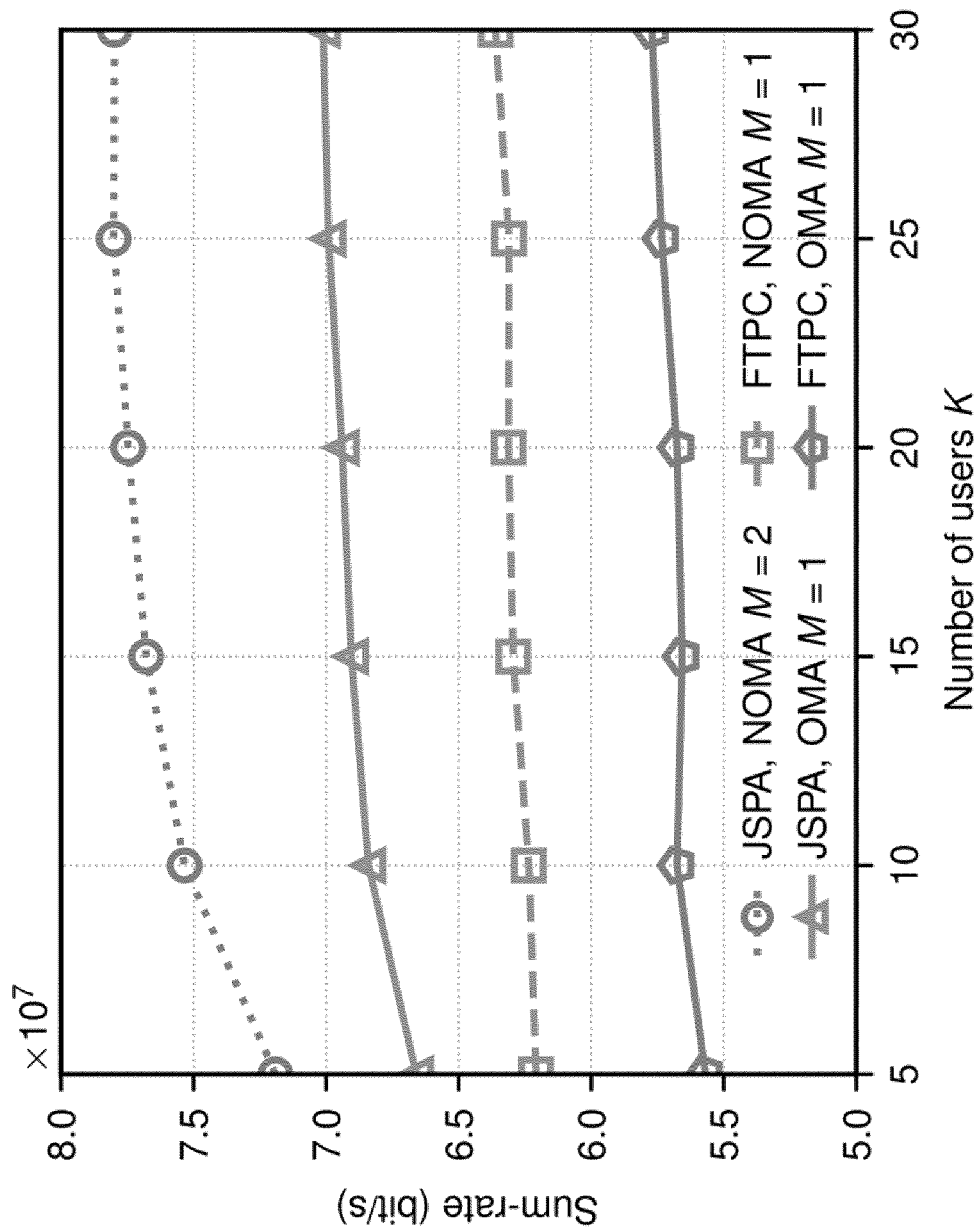
FIG. 7 shows a diagram for illustrating a comparison of results achievable by implementing a JSPA procedure according to some examples of embodiments and results achievable by a FTPC procedure.

FIGS. 6 and 7 illustrate diagrams showing a comparison of results achievable by implementing the JSPA procedure as depicted, for example, in FIG. 3 according to some examples of embodiments and results achievable by using the FTPC procedure FTPC with greedy subcarrier allocation (the decay factor of FTPC is set to 0.4, which is a commonly set value). Specifically, in FIG. 6, a proportional fairness index of JSPA and FTPC for different systems, i.e., OMA with M=1, NOMA with M=2 and M=3 is shown in relation to the number of users K, while in FIG. 7, the sum-rate in [bit/s] of JSPA and LDDP for different systems, i.e., OMA with M=1, NOMA with M=2 and M=3 is shown in relation to the number of users K. Specifically, FIG. 6 shows a proportional fairness index defined as $\Sigma_{k \in \mathcal{K}} \log(R_k^{mean})/K$, while FIG. 7 shows the sum-rate $\Sigma_{k \in \mathcal{K}} R_k^{mean}$ discussed below.

It is to be noted that the results shown in FIGS. 6 and 7 are achieved by implementing a proportional fair scheduler on one frame, which is composed of T=20 time slots. The objective of this setup is to evaluate the fairness performance of the JSPA scheme when the weights are chosen according to a proportional fair scheduling. The channel state information is collected at the beginning of the frame. Let $R_k(t)$ be user k's data rate at time slot $t \in \{1, \ldots, T\}$, and $\overline{R}_k(t)$ be user k's average data rate prior to t. In a proportional fair scheduling, $\overline{R}_k(t)$ is updated as follows:

$$\overline{R}_k(t+1) = \left(1 - \frac{1}{T}\right)\overline{R}_k(t) + \frac{1}{T}R_k(t).$$

The weight of user k at time t is then set as $w_k(t)=1/\overline{R}_k(t)$, in order to achieve a good tradeoff between spectral efficiency and user fairness. At the end of the frame, each user k's data rate is averaged over the entire frame, i.e., $R_k^{mean} = \sum_{t=1}^{T} R_k(t)/T$.

As can be seen in FIGS. 6 and 7, the JSPA procedure according to examples of embodiments outperforms the heuristic FTPC in both user fairness and sum-rate performance, and in both the OMA and NOMA systems. For example, in FIG. 7 for K=30, the sum-rate gain of JSPA in NOMA with M=2 and in OMA are respectively 23% and 21%.

As discussed above, according to examples of embodiments of the invention, the WSR maximization problem in MC-NOMA with cellular power constraint is solved by providing a two-stage approach in which two sub-problems are solved optimally with low complexity. Specifically, the user selection combinatorial problem is solved e.g. by SCUS (as proposed in Algorithm 2 discussed above, for example) on the basis of dynamic programming. The multi-carrier power control non-convex problem is solved by the two-stage algorithm MCPC (as proposed in Algorithm 4 or 4' discussed above, for example), which uses separability property and gradient descent methods. These algorithms are basic building blocks that can be applied in a wide range of resource allocation problems. Furthermore, JSPA is proposed to tackle the joint subcarrier and power allocation problem. By means of these approaches, near-optimal WSR and user fairness can be achieved.

Figure 8:
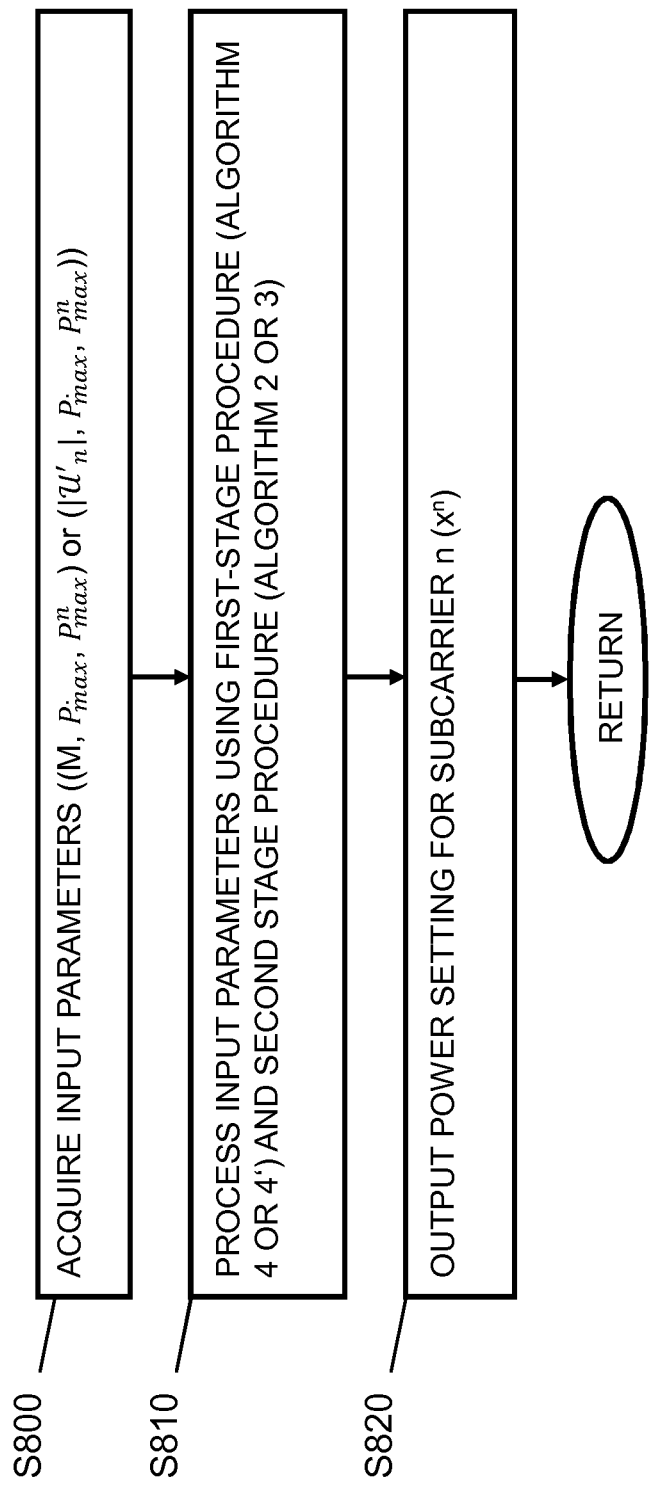
FIG. 8 shows a flow chart of a processing executed by a communication network control element or function according to some examples of embodiments.

FIG. 8 shows a flow chart of a processing executed by a communication network control element or function according to some examples of embodiments, which conducts a radio resource management control for a communication to at least one communication element or function (UE) in a communication network by using a plurality of subcarriers. Preferably, the communication network control element or function is configured to use NOMA for communicating with at least one communication element or function.

In S800, input parameters for the processing are acquired. According to examples of embodiments, as the input parameters, a set of a maximum total power budget, a maximum power budget for each subcarrier, and at least one of a maximum number of multiplexed users per subcarrier and a number of allocated users per subcarrier is acquired.

In S810, the input parameters are processed by using a first-stage procedure for maximizing a weighted sum-rate for a fixed subcarrier allocation for all subcarriers, and a second-stage procedure for determining a power allocation for a single subcarrier under consideration of specified multiplexing and interference cancellation constraints. A processing result output from the first-stage procedure is input into the second-stage procedure, and a processing result output from the second-stage procedure is returned to the first-stage procedure.

According to examples of embodiments, in the first-stage procedure, as the input parameters, the maximum total power budget, the maximum power budget for each subcarrier, and the maximum number of multiplexed users per subcarrier is processed by using a projected gradient descent on each power budget for each subcarrier to maximize the weighted sum-rate. The first-stage procedure is based, for example, on the MCPC procedure described above, wherein e.g. one of Algorithm 4' can be employed. From the first-stage procedure to the second stage procedure, an indication of the subcarrier to be considered, the maximum number of multiplexed users per subcarrier and the power budget for the indicated subcarrier are output. Then, in the second-stage procedure, the indication of the subcarrier to be considered, the maximum number of multiplexed users per subcarrier and the power budget for the indicated subcarrier for computing an optimal single-carrier power allocation under the power budget for the indicated subcarrier are processed. Furthermore, in the second-stage procedure, a constraint indicating that the number of allocated users is equal to or less than the maximum number of multiplexed users per subcarrier is considered. The second-stage procedure is based, for example, on the SCUS procedure described above, wherein e.g. Algorithm 2 can be employed. Then, from the second-stage procedure to the first-stage procedure, an indication of the subcarrier to be considered, a parameter for determining the weighted sum-rate and the computed optimal single-carrier power allocation are output. These parameters are processed in the first-stage procedure.

According to examples of embodiments, in the processing in the first-stage procedure of the parameter for determining the weighted sum-rate and the computed optimal single-carrier power allocation, the computed optimal single-carrier power allocation is output, and/or the parameter for determining the weighted sum-rate and the computed optimal single-carrier power allocation are used in a next iteration for providing an input into the second-stage procedure by updating parameters used in the processing of the first-stage procedure.

According to examples of embodiments, the processing in the first-stage procedure and the second stage procedure is based on $$\text{maximize}_{p} \sum_{k \in \mathcal{K}} w_k \sum_{n \in \mathcal{N}} R_k^n(p^n), \quad (P)$$

$$\text{subject to } C1: \sum_{k \in \mathcal{K}} \sum_{n \in \mathcal{N}} p_k^n \leq P_{max},$$

$$C2: \sum_{k \in \mathcal{K}} p_k^n \leq P_{max}^n, n \in \mathcal{N},$$

$$C3: p_k^n \geq 0, k \in \mathcal{K}, n \in \mathcal{N},$$

$$C4: |\mathcal{U}_n| \leq M, n \in \mathcal{N}.$$

wherein $w_K$ is a sequence of K positive weights, $R_k^n(p^n)$ is a maximum achievable data rage of user k on a subcarrier n, P represents a joint subcarrier and power allocation optimization problem P, C1 represents a cellular power constraint in form of the total power budget, C2 sets a power limit for each subcarrier n, C3 defines that the allocated powers remain non-negative, and C4 restricts the maximum number of multiplexed users per subcarrier to M.

In S820, on the basis of results of the processing in the first-stage procedure and the second-stage procedure, a power setting for at least one subcarrier is output.

Figure 9:
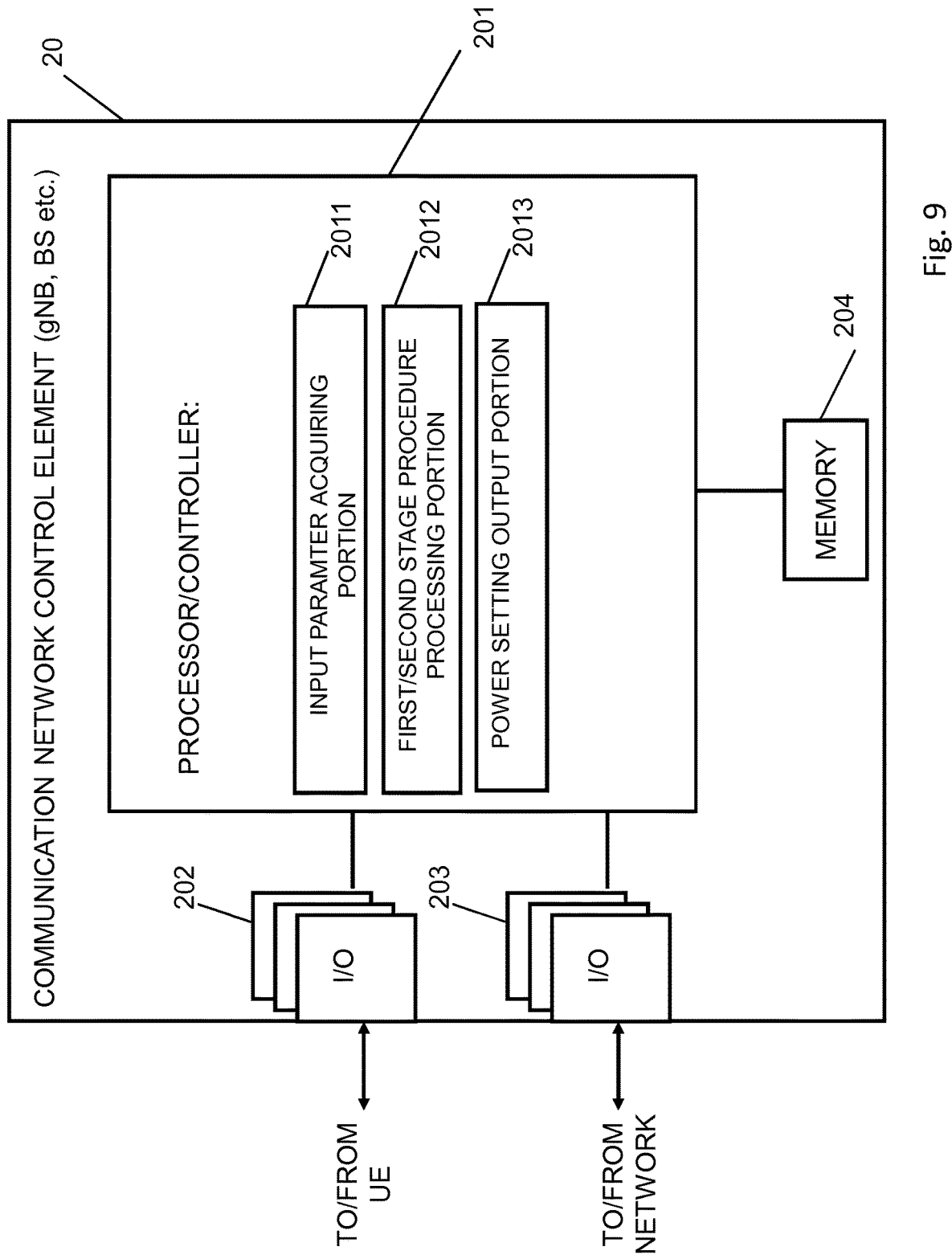
FIG. 9 shows a diagram of a network element or function representing a communication network control element or function according to some examples of embodiments.

FIG. 9 shows a diagram of a network element or function representing a communication network control element or function according to some examples of embodiments, e.g. the BS 20 of FIG. 1, which is configured to conduct a radio resource management control procedure as described in connection with some of the examples of embodiments. It is to be noted that the communication network control element or function, like the BS 20 of FIG. 1, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function shown in FIG. 9 may include a processing circuitry, a processing function, a control unit or a processor 201, such as a CPU or the like, which is suitable for executing instructions given by programs or the like related to the paging control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a communication element or function like the UEs 10, 12, 13, as described in connection with FIG. 1, for example. The I/O units 203 may be used for communicating with other network element, like core network elements. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described paging control processing. In particular, the processor or processing circuitry or function 201 includes one or more of the following sub-portions. Sub-portion 2011 is a processing portion which is usable as a portion for acquiring input data. The portion 2011 may be configured to perform processing according to S800 of FIG. 8. Furthermore, the processor or processing circuitry or function 201 may include a sub-portion 2012 usable as a portion for conducting a processing using the first-stage and second-stage procedures. The portion 2012 may be configured to perform a processing according to S810 of FIG. 8. In addition, the processor or processing circuitry or function 201 may include a sub-portion 2013 usable as a portion for outputting the power setting value. The portion 2013 may be configured to perform a processing according to S820 of FIG. 8.

It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

According to a further example of embodiments, there is provided, for example, an apparatus for use by a communication network control element or function configured to conduct a radio resource management control for a communication to at least one communication element or function in a communication network by using a plurality of subcarriers, the apparatus comprising: means configured to acquire input parameters; means configured to process the input parameters by using a first-stage procedure for maximizing a weighted sum-rate for a fixed subcarrier allocation for all subcarriers, and a second-stage procedure for determining a power allocation for a single subcarrier under consideration of specified multiplexing and interference cancellation constraints, wherein a processing result output from the first-stage procedure is input into the second-stage procedure, and a processing result output from the second-stage procedure is returned to the first-stage procedure; and means configured to output, on the basis of results of the processing in the first-stage procedure and the second-stage procedure, a power setting for at least one subcarrier.

Furthermore, according to some other examples of embodiments, the above defined apparatus may further comprise means for conducting at least one of the processing defined in the above described methods, for example a method according to that described in connection with FIG. 8.

According to a further example of embodiments, there is provided, for example, a non-transitory computer readable medium comprising program instructions for causing an apparatus to perform at least the following: conducting a radio resource management control for a communication to at least one communication element or function in a communication network by using a plurality of subcarriers; acquiring input parameters; processing the input parameters by using a first-stage procedure for maximizing a weighted sum-rate for a fixed subcarrier allocation for all subcarriers, and a second-stage procedure for determining a power allocation for a single subcarrier under consideration of specified multiplexing and interference cancellation constraints, wherein a processing result output from the first-stage procedure is input into the second-stage procedure, and a processing result output from the second-stage procedure is returned to the first-stage procedure; and outputting, on the basis of results of the processing in the first-stage procedure and the second-stage procedure, a power setting for at least one subcarrier.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The information claimed is:

1. An apparatus for use with a communication network control element or function configured to conduct a radio resource management control for a communication to at least one communication element or function in a communication network with using a plurality of subcarriers, the apparatus comprising
at least one processing circuitry, and
at least one non-transitory memory for storing instructions to be executed by the processing circuitry,
wherein the at least one memory and the instructions are configured to, with the at least one processing circuitry, cause the apparatus at least:
to acquire input parameters;
to process the input parameters with using:
a first-stage procedure for maximizing a weighted sum-rate for a fixed subcarrier allocation for all subcarriers, and
a second-stage procedure for determining a power allocation for a single subcarrier under consideration of specified multiplexing and interference cancellation constraints,
wherein a processing result output from the first-stage procedure is input into the second-stage procedure, and a processing result output from the second-stage procedure is returned to the first-stage procedure; and
to output, on the basis of results of the processing in the first-stage procedure and the second-stage procedure, a power setting for at least one subcarrier.

2. The apparatus according to claim 1, wherein the at least one memory and the instructions are further configured to, with the at least one processing circuitry, cause the apparatus at least:
to acquire, as the input parameters, a maximum total power budget, a maximum power budget for each subcarrier, and at least one of a maximum number of multiplexed users per subcarrier or a number of allocated users per subcarrier.

3. The apparatus according to claim 2, wherein the at least one memory and the instructions are further configured to, with the at least one processing circuitry, cause the apparatus at least:
to process, in the first-stage procedure, as the input parameters, the maximum total power budget, the maximum power budget for each subcarrier, and the maximum number of multiplexed users per subcarrier, with using a projected gradient descent on each power budget for each subcarrier to maximize the weighted sum-rate,
to output, from the first-stage procedure to the second stage procedure, an indication of the subcarrier to be considered, the maximum number of multiplexed users per subcarrier and the power budget for the indicated subcarrier,
to process, in the second-stage procedure, the indication of the subcarrier to be considered, the maximum number of multiplexed users per subcarrier and the power budget for the indicated subcarrier for computing an optimal single-carrier power allocation under the power budget for the indicated subcarrier and with considering a constraint indicating that the number of allocated users is equal to or less than the maximum number of multiplexed users per subcarrier, to output, from the second-stage procedure to the first-stage procedure, an indication of the subcarrier to be considered, a parameter for determining the weighted sum-rate and the computed optimal single-carrier power allocation, and to process, in the first-stage procedure, the parameter for determining the weighted sum-rate and the computed optimal single-carrier power allocation.

4. The apparatus according to claim 3, wherein the at least one memory and the instructions are further configured to, with the at least one processing circuitry, cause the apparatus at least:
in the processing in the first-stage procedure of the parameter for determining the weighted sum-rate and the computed optimal single-carrier power allocation, to conduct at least one of:
outputting the computed optimal single-carrier power allocation, or
using the parameter for determining the weighted sum-rate and the computed optimal single-carrier power allocation in a next iteration for providing an input into the second-stage procedure with updating parameters used in the processing of the first-stage procedure.

5. The apparatus according to claim 1, wherein the processing in the first-stage procedure and the second stage procedure is based on $$\text{maximize}_p \sum_{k \in \mathcal{K}} w_k \sum_{n \in \mathcal{N}} R_k^n(p^n), \quad \text{(P)}$$

$$\text{subject to } C1: \sum_{k \in \mathcal{K}} \sum_{n \in \mathcal{N}} p_k^n \leq P_{max},$$

$$C2: \sum_{k \in \mathcal{K}} p_k^n \leq P_{max}^n, n \in \mathcal{N},$$

$$C3: p_k^n \geq 0, k \in \mathcal{K}, n \in \mathcal{N},$$

$$C4: |\mathcal{U}_n| \leq M, n \in \mathcal{N}.$$

wherein $w_K$ is a sequence of K positive weights, $R_k^n(p^n)$ is a maximum achievable data rage of user k on a subcarrier n, P represents a joint subcarrier and power allocation optimization problem P, C1 represents a cellular power constraint in form of the total power budget, C2 sets a power limit for each subcarrier n, C3 defines that the allocated powers remain non-negative, and C4 restricts the maximum number of multiplexed users per subcarrier to M.

6. The apparatus according to claim 1, wherein the communication network control element or function is configured to use at least one of non-orthogonal multiple access or orthogonal multiple access for communicating with the at least one communication element or function.

7. A method for use in a communication network control element or function configured to conduct a radio resource management control for a communication to at least one communication element or function in a communication network with using a plurality of subcarriers, the method comprising
acquiring input parameters;
processing the input parameters with using:
  a first-stage procedure for maximizing a weighted sum-rate for a fixed subcarrier allocation for all subcarriers, and
  a second-stage procedure for determining a power allocation for a single subcarrier under consideration of specified multiplexing and interference cancellation constraints,
wherein a processing result output from the first-stage procedure is input into the second-stage procedure, and a processing result output from the second-stage procedure is returned to the first-stage procedure; and
outputting, on the basis of results of the processing in the first-stage procedure and the second-stage procedure, a power setting for at least one subcarrier.

8. The method according to claim 7, further comprising:
acquiring, as the input parameters, a maximum total power budget, a maximum power budget for each subcarrier, and at least one of a maximum number of multiplexed users per subcarrier or a number of allocated users per subcarrier.

9. The method according to claim 8, further comprising
processing, in the first-stage procedure, as the input parameters, the maximum total power budget, the maximum power budget for each subcarrier, and the maximum number of multiplexed users per subcarrier, with using a projected gradient descent on each power budget for each subcarrier to maximize the weighted sum-rate,
outputting, from the first-stage procedure to the second stage procedure, an indication of the subcarrier to be considered, the maximum number of multiplexed users per subcarrier and the power budget for the indicated subcarrier,
processing, in the second-stage procedure, the indication of the subcarrier to be considered, the maximum number of multiplexed users per subcarrier and the power budget for the indicated subcarrier for computing an optimal single-carrier power allocation under the power budget for the indicated subcarrier and with considering a constraint indicating that the number of allocated users is equal to or less than the maximum number of multiplexed users per subcarrier,
outputting, from the second-stage procedure to the first-stage procedure, an indication of the subcarrier to be considered, a parameter for determining the weighted sum-rate and the computed optimal single-carrier power allocation, and
processing, in the first-stage procedure, the parameter for determining the weighted sum-rate and the computed optimal single-carrier power allocation.

10. The method according to claim 9, further comprising
conducting, In the processing in the first-stage procedure of the parameter for determining the weighted sum-rate and the computed optimal single-carrier power allocation, at least one of:
outputting the computed optimal single-carrier power allocation, or
using the parameter for determining the weighted sum-rate and the computed optimal single-carrier power allocation in a next iteration for providing an input into the second-stage procedure with updating parameters used in the processing of the first-stage procedure.

11. The method according to claim 7, wherein the processing in the first-stage procedure and the second stage procedure is based on $$\text{maximize}_p \sum_{k \in \mathcal{K}} w_k \sum_{n \in \mathcal{N}} R_k^n(p^n), \quad \text{(P)}$$

$$\text{subject to } C1: \sum_{k \in \mathcal{K}} \sum_{n \in \mathcal{N}} p_k^n \leq P_{max},$$

$$C2: \sum_{k \in \mathcal{K}} p_k^n \leq P_{max}^n, n \in \mathcal{N},$$

$$C3: p_k^n \geq 0, k \in \mathcal{K}, n \in \mathcal{N},$$

$$C4: |\mathcal{U}_n| \leq M, n \in \mathcal{N}.$$

wherein $w_K$ is a sequence of K positive weights, $R_k^n(p^n)$ is a maximum achievable data rage of user k on a subcarrier n, P represents a joint subcarrier and power allocation optimization problem P, C1 represents a cellular power constraint in form of the total power budget, C2 sets a power limit for each subcarrier n, C3 defines that the allocated powers remain non-negative, and C4 restricts the maximum number of multiplexed users per subcarrier to M.

12. The method according to claim 7, wherein the communication network control element or function is configured to use at least one of non-orthogonal multiple access or orthogonal multiple access for communicating with the at least one communication element or function.

13. A non-transitory computer-readable medium comprising program instructions stored thereon which are configured, when executed with at least one processor, to perform the method of claim 7, wherein a computer program product comprises the computer-readable medium on which the program instructions are stored, and the computer program product is directly loadable into an internal memory of a computer and/or transmittable with a network with at least one of upload, download or push procedures.

\* \* \* \* \*